United States Patent
Dudar

(10) Patent No.: US 10,961,937 B2
(45) Date of Patent: Mar. 30, 2021

(54) SYSTEMS AND METHODS FOR IMPROVING VEHICLE ENGINE STABILITY

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 16/418,894

(22) Filed: May 21, 2019

(65) Prior Publication Data

US 2020/0370497 A1    Nov. 26, 2020

(51) Int. Cl.
| | |
|---|---|
| F02M 25/08 | (2006.01) |
| F02D 41/22 | (2006.01) |
| F02D 33/00 | (2006.01) |
| F02M 33/02 | (2006.01) |
| F02M 37/00 | (2006.01) |
| F02D 41/00 | (2006.01) |
| B60K 15/035 | (2006.01) |

(52) U.S. Cl.
CPC ...... *F02D 41/221* (2013.01); *B60K 15/03504* (2013.01); *B60K 15/03519* (2013.01); *F02D 33/003* (2013.01); *F02D 41/0032* (2013.01); *F02M 25/0809* (2013.01); *F02M 25/0827* (2013.01); *F02M 25/0836* (2013.01); *F02M 25/0854* (2013.01); *F02M 33/025* (2013.01); *F02M 37/0076* (2013.01)

(58) Field of Classification Search
CPC ............... F02M 25/08; F02M 25/0809; F02M 25/0818; F02M 25/0827; F02M 25/0836; F02M 25/089; F02M 41/222
USPC ........................................................ 123/520
See application file for complete search history.

(56) References Cited

U.S. PATENT DOCUMENTS

| | | | |
|---|---|---|---|
| 5,090,388 A | 2/1992 | Hamburg et al. | |
| 5,427,075 A * | 6/1995 | Yamanaka | F02M 25/0809 123/198 D |
| 5,441,031 A * | 8/1995 | Kiyomiya | F02M 25/08 123/518 |

(Continued)

OTHER PUBLICATIONS

"How Does a Tesla Over-the-Air-Software Update Work?," Teslarati Website, Available Online at https://www.teslarati.com/tesla-air-software-update-world/, Jun. 21, 2014, 6 pages.

(Continued)

*Primary Examiner* — John M Zaleskas
(74) *Attorney, Agent, or Firm* — Geoffrey Brumbaugh; McCoy Russell LLP

(57) ABSTRACT

Methods and systems are provided for conducting a diagnostic on a fuel tank isolation valve that regulates a flow of fuel vapors from a fuel tank to an evaporative emissions system. In one example, a method comprises determining whether the fuel tank isolation valve is stuck in a first open position or a second open position based on a time duration between commanding open a canister purge valve to direct fuel vapors to an engine, and an exhaust gas sensor indicating a rich air-fuel ratio. In this way, appropriate mitigating action may be taken in response to the fuel tank isolation valve being stuck in either the first open position or the second open position.

17 Claims, 12 Drawing Sheets

(56) References Cited

U.S. PATENT DOCUMENTS

| | | | | |
|---|---|---|---|---|
| 5,450,834 A | * | 9/1995 | Yamanaka | F02M 25/0809 123/198 D |
| 5,477,842 A | * | 12/1995 | Maruyama | F02M 25/0809 123/519 |
| 5,592,923 A | * | 1/1997 | MacHida | F02M 25/0809 123/520 |
| 5,826,566 A | * | 10/1998 | Isobe | F02M 25/0809 123/520 |
| 5,857,447 A | * | 1/1999 | Shinohara | F02M 25/0809 123/520 |
| 6,119,662 A | | 9/2000 | Duty et al. | |
| 6,378,505 B1 | * | 4/2002 | Doering | F02M 25/0809 123/198 D |
| 6,382,191 B1 | * | 5/2002 | Curran | F02D 41/004 123/518 |
| 6,422,214 B1 | * | 7/2002 | Sealy | F02D 41/0045 123/520 |
| 9,416,755 B2 | | 8/2016 | Dudar | |
| 9,518,677 B2 | | 12/2016 | Dudar et al. | |
| 9,599,071 B2 | | 3/2017 | Dudar | |
| 9,822,719 B2 | | 11/2017 | Dudar et al. | |
| 9,856,828 B2 | | 1/2018 | Dudar | |
| 10,655,570 B1 | * | 5/2020 | Sager | F02D 41/003 |
| 10,704,478 B1 | * | 7/2020 | Dudar | F02D 41/004 |
| 2004/0089062 A1 | * | 5/2004 | Matsubara | F02M 25/0818 73/114.41 |
| 2004/0089064 A1 | * | 5/2004 | Kidokoro | F02M 25/0809 73/114.41 |
| 2006/0081224 A1 | * | 4/2006 | Spink | F02M 25/0836 123/519 |
| 2006/0162433 A1 | * | 7/2006 | Matsubara | F02M 25/0818 73/114.39 |
| 2007/0239330 A1 | * | 10/2007 | Baumann | F02M 25/0818 701/33.7 |
| 2009/0007890 A1 | * | 1/2009 | Devries | F02M 25/089 123/520 |
| 2010/0224171 A1 | | 9/2010 | Peters et al. | |
| 2011/0079201 A1 | * | 4/2011 | Peters | F02M 25/0818 123/520 |
| 2011/0166765 A1 | * | 7/2011 | Debastos | F02D 41/021 701/102 |
| 2011/0290000 A1 | * | 12/2011 | Debastos | F02M 25/0818 73/23.31 |
| 2011/0295482 A1 | * | 12/2011 | Pearce | F02M 25/0818 701/102 |
| 2012/0152210 A1 | * | 6/2012 | Reddy | F02M 25/089 123/520 |
| 2012/0211087 A1 | * | 8/2012 | Dudar | F02D 41/0032 137/12 |
| 2013/0037007 A1 | * | 2/2013 | Reddy | B60K 15/03504 123/521 |
| 2014/0130785 A1 | | 5/2014 | Levijoki et al. | |
| 2014/0174573 A1 | * | 6/2014 | Matsunaga | F02M 25/0809 137/565.23 |
| 2015/0013437 A1 | * | 1/2015 | Takakura | F02M 25/0818 73/40.5 R |
| 2015/0020780 A1 | * | 1/2015 | Takakura | F02D 41/0045 123/520 |
| 2015/0040645 A1 | * | 2/2015 | Takakura | G01M 3/025 73/47 |
| 2015/0083088 A1 | * | 3/2015 | Pearce | F02M 25/0872 123/520 |
| 2015/0114361 A1 | * | 4/2015 | Matsunaga | F02M 25/089 123/520 |
| 2015/0122228 A1 | * | 5/2015 | Bolger | F02D 41/004 123/518 |
| 2015/0122229 A1 | * | 5/2015 | Dudar | F02M 25/0818 123/518 |
| 2015/0184620 A1 | * | 7/2015 | Dudar | F02M 25/0809 73/114.38 |
| 2016/0053726 A1 | * | 2/2016 | Dudar | F02M 25/0836 123/520 |
| 2016/0160808 A1 | * | 6/2016 | Dudar | F02D 41/003 701/104 |
| 2016/0298576 A1 | * | 10/2016 | Reddy | B60K 15/03504 |
| 2016/0298579 A1 | * | 10/2016 | Peters | F16K 31/10 |
| 2016/0341141 A1 | * | 11/2016 | Dudar | G01M 3/3272 |
| 2016/0341155 A1 | | 11/2016 | Dudar et al. | |
| 2016/0356247 A1 | * | 12/2016 | Dudar | F02M 25/0827 |
| 2017/0058799 A1 | * | 3/2017 | Dudar | F02M 25/0836 |
| 2017/0096974 A1 | | 4/2017 | Dudar | |
| 2017/0130659 A1 | * | 5/2017 | Dudar | B60K 15/03504 |
| 2017/0145963 A1 | * | 5/2017 | Dudar | F02M 25/0872 |
| 2017/0167413 A1 | * | 6/2017 | Tagawa | F02D 41/003 |
| 2018/0022211 A1 | * | 1/2018 | Hill | B60K 15/03504 123/520 |
| 2018/0195467 A1 | * | 7/2018 | Dudar | F02D 41/0035 |
| 2019/0024599 A1 | * | 1/2019 | Dudar | G01N 33/0006 |
| 2019/0101072 A1 | * | 4/2019 | Dudar | F02D 41/0035 |
| 2019/0360412 A1 | * | 11/2019 | Dudar | F02D 41/0045 |
| 2019/0360434 A1 | * | 11/2019 | Dudar | F02D 41/004 |
| 2020/0189385 A1 | * | 6/2020 | Dudar | B60K 15/03504 |
| 2020/0224598 A1 | * | 7/2020 | Dudar | F02D 41/0035 |

OTHER PUBLICATIONS

Udar, A. et al., "Systems and Methods For Onboard Canister Purge Valve Flow Mapping," U.S. Appl. No. 15/987,028, filed May 23, 2018, 130 pages.

Dudar, A. et al., "Systems and Methods for Onboard Canister Purge Valve Flow Mapping," U.S. Appl. No. 15/987,046, filed May 23, 2018, 130 pages.

Dudar, A., "Method and System for Vehicle Refueling," U.S. Appl. No. 16/218,335, filed Dec. 12, 2018, 51 pages.

Dudr, A., "Systems and Methods for Improving Vehicle Engine Stability," U.S. Appl. No. 16/418,916, filed May 21, 2019, 107 pages.

"Tesla's electric car serves as a life saviour for Hurricane hit Florida," The Express Tribune Website, Available Online at https://tribune.com.pk/story/1504124/teslas-electric-car-serves-life-saviour-hurricane-hit-florida/, Sep. 12, 2017, 3 pages.

* cited by examiner

FIG. 9

| Extent to which canister filter is clogged | Fuel vapor transit time | |
|---|---|---|
| | 1st duration | 2nd duration |
| 0% | 2-4s | 4.1-10s |
| 25% | 2.5-5s | 5.1-12.5s |
| 50% | 3-6s | 6.1-15s |
| 75% | 3.5-9s | 9.1-17.5s |

900

SYSTEMS AND METHODS FOR IMPROVING VEHICLE ENGINE STABILITY

FIELD

The present description relates generally to methods and systems for conducting a diagnostic on a valve that selectively controls an amount of fuel vapors inducted to a vehicle engine from a fuel tank and fuel vapor storage canister.

BACKGROUND/SUMMARY

Vehicle emission control systems may be configured to store refueling vapors, and in some examples running-loss vapors and diurnal emissions in a fuel vapor canister, and then purge the stored vapors during a subsequent engine operation. The stored vapors may be routed to engine intake for combustion, further improving fuel economy for the vehicle. In a typical canister purge operation, a canister purge valve (CPV) coupled between the engine intake and the fuel vapor canister is opened or duty cycled, allowing for intake manifold vacuum to be applied to the fuel vapor canister. Fresh air may be drawn through the fuel vapor canister via an open canister vent valve. This configuration facilitates desorption of stored fuel vapors from the adsorbent material in the canister, regenerating the adsorbent material for further fuel vapor adsorption.

Certain hybrid electric vehicles, for example plug-in hybrid electric vehicles (PHEVs) further include a fuel tank that is sealed via a fuel tank isolation valve (FTIV). Such fuel tanks are sealed in order to reduce loading of the fuel vapor canister during diurnal temperature fluctuations and while the vehicle is in operation, as opportunities for purging of the fuel vapor canister may be limited due to limited engine run-time for such vehicles. While such fuel tanks may reduce canister loading, pressure builds within such fuel tanks may have to be periodically relieved for fuel tank integrity reasons and/or to reduce fuel tank depressurization times in response to requests to refuel the fuel tank. In one example, while the engine is operating to combust air and fuel vehicle control strategy may duty cycle the FTIV (with the CPV open) in order to relieve fuel tank pressure and route fuel tank vapors to the engine for combustion.

However, it can be challenging to determine whether the FTIV is functioning as desired or expected, or is degraded to at least some extent. For example, the FTIV may be adjustable between open and closed positions via a short electrical pulse. However, the position of the FTIV may not be known without an additional sensor. Toward this end, U.S. Pat. No. 9,518,677 discloses a method that comprises sending an electrical pulse to the FTIV, and comparing a current draw of the FTIV to a known current draw profile to verify the position of the FTIV. However, the inventors have herein recognized potential issues with such an approach. Specifically, such an approach may not allow for diagnosing an FTIV that can be configured in one of two open positions. In other words, the method disclosed by U.S. Pat. No. 9,518,677 may not be able to discriminate between an FTIV stuck in a first open position or a second open position, under conditions where the FTIV can be configured in either the first or second open position.

Thus, the inventors have recognized the above-mentioned issues, and have herein developed systems and methods to at least partially address them. In one example, a method comprises diagnosing whether a fuel tank isolation valve positioned in a load conduit between a fuel system and a fuel vapor storage canister is stuck in a first open position or a second open position based on a time duration between commanding open a canister purge valve to direct fuel vapors to an engine and an exhaust gas sensor indicating a rich air-fuel ratio as compared to a stoichiometric air-fuel ratio. In this way, it may be inferred whether a three-way fuel tank isolation valve is stuck in a first open position or a second open position, and such information may be relied upon in order to take appropriate mitigating action depending on particular vehicle operating conditions.

In one example, the fuel tank isolation valve being stuck in the first open position directs fuel vapors from the fuel system through a portion of the fuel vapor storage canister in response to the canister purge valve being commanded open, and the fuel tank isolation valve being stuck in the second open position directs fuel vapors from the fuel system through an entirety of the fuel vapor storage canister in response to the canister purge valve being commanded open. Accordingly, the fuel tank isolation valve may be indicated to be stuck in the first open position in response to the time duration comprising a first time duration and the fuel tank isolation valve may be indicated to be stuck in the second open position in response to the time duration comprising the second time duration. The first time duration may comprise a shorter duration than the second time duration.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 9 depicts an example lookup table that includes information derived from the method of FIG. 8, for use with the method of FIG. 6.

DETAILED DESCRIPTION

The following description relates to systems and methods for conducting fuel tank pressure control operations, also referred to herein as tank pressure control or TPC operations. Specifically, such systems and methods relate to conducting such TPC operations where, even under conditions where degraded engine stability is indicated as a result of the routing of fuel tank vapors to the engine for combustion, the TPC operation may continue without having to be aborted. More specifically, for such a TPC operation, fuel tank vapors may be routed along a first flow path that includes the vapors being routed through a portion (e.g. buffer region) of a fuel vapor canister and then to the engine, provided a condition of degraded engine stability is not indicated. However, responsive to such an indication of degraded engine stability, then the fuel vapors may be re-routed along a second flow path that includes the vapors being routed through an entirety of the fuel vapor canister, prior to being directed to the engine. Such systems and methods are particularly advantageous for hybrid electric vehicles with limited engine run time, such as the hybrid vehicle depicted at FIG. 1, as for such vehicles it is desirable to avoid aborting TPC operations and/or canister purging operations. For controlling the flow path whereby fuel tank vapors are routed to the engine, a three-way fuel tank isolation valve may be relied upon, as depicted in detail at FIG. 2.

Figure 3:
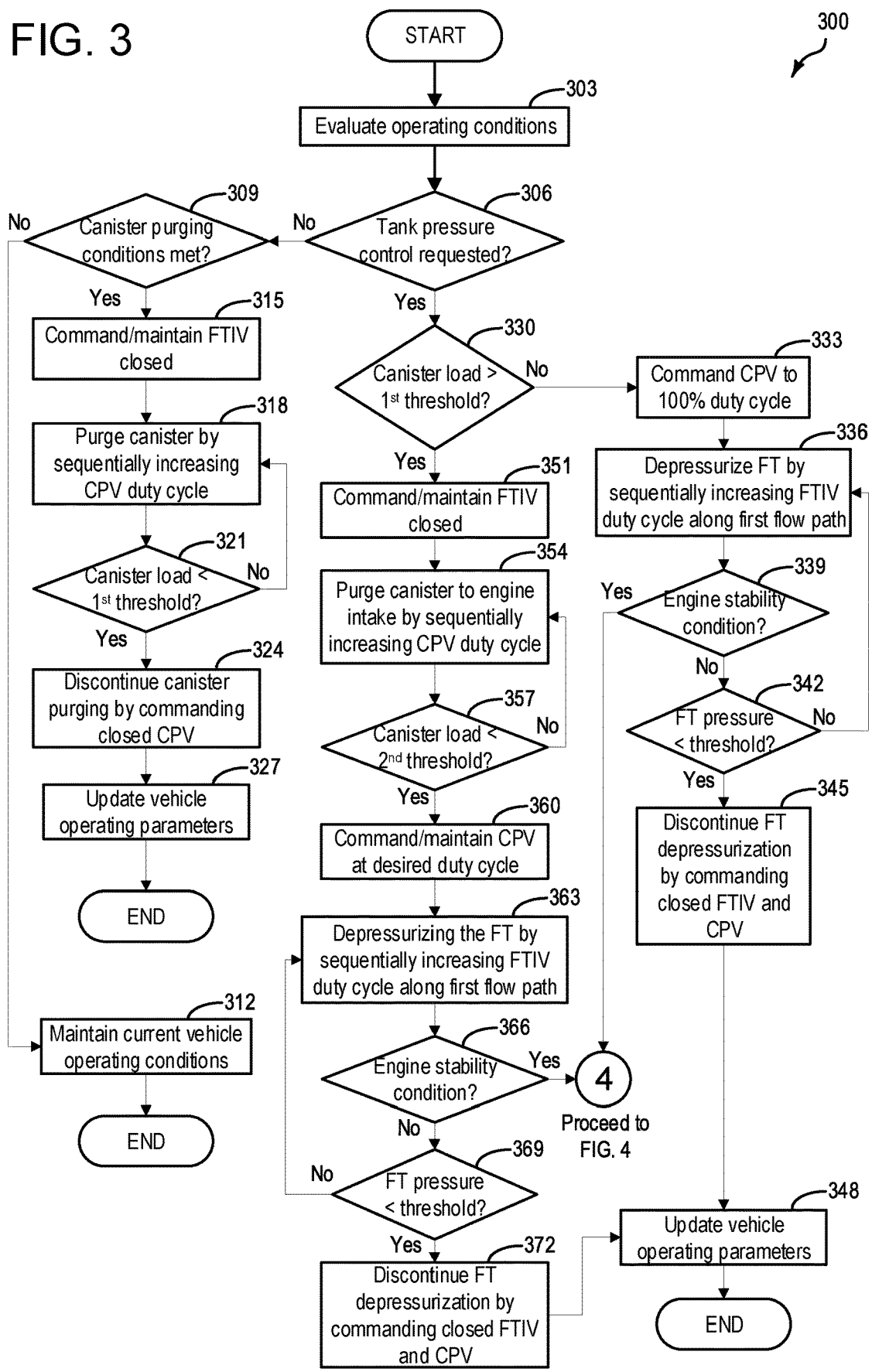
FIG. 3 depicts a flowchart for a high-level example method for controlling fuel vapor canister purging and/or fuel tank pressure control.
Figure 4:
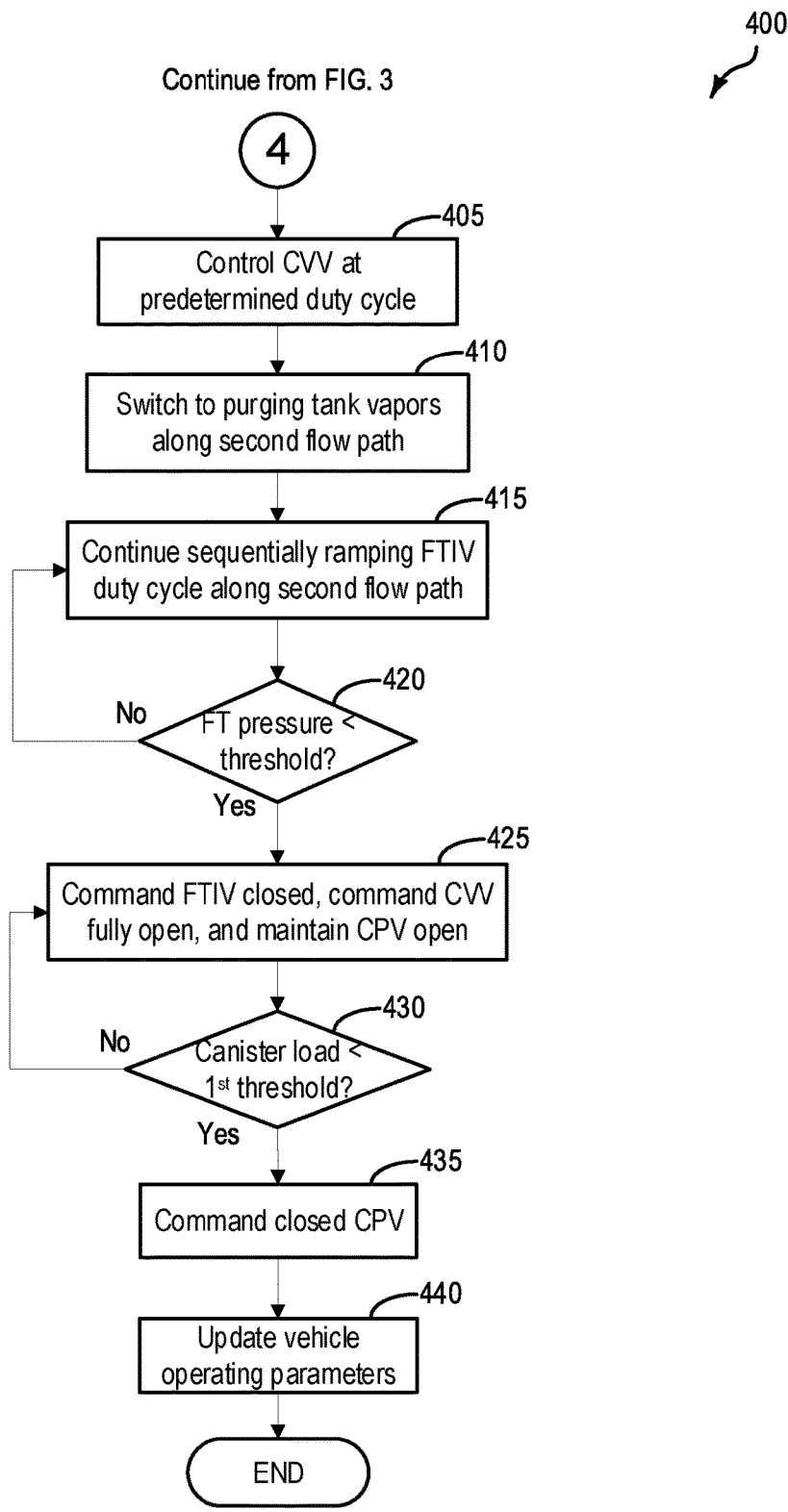
FIG. 4 depicts a flowchart for a high-level example method that continues from the method of FIG. 3 and which includes re-routing the flow of fuel tank vapors to engine intake in response to an indication of a degraded engine stability condition.
Figure 5:
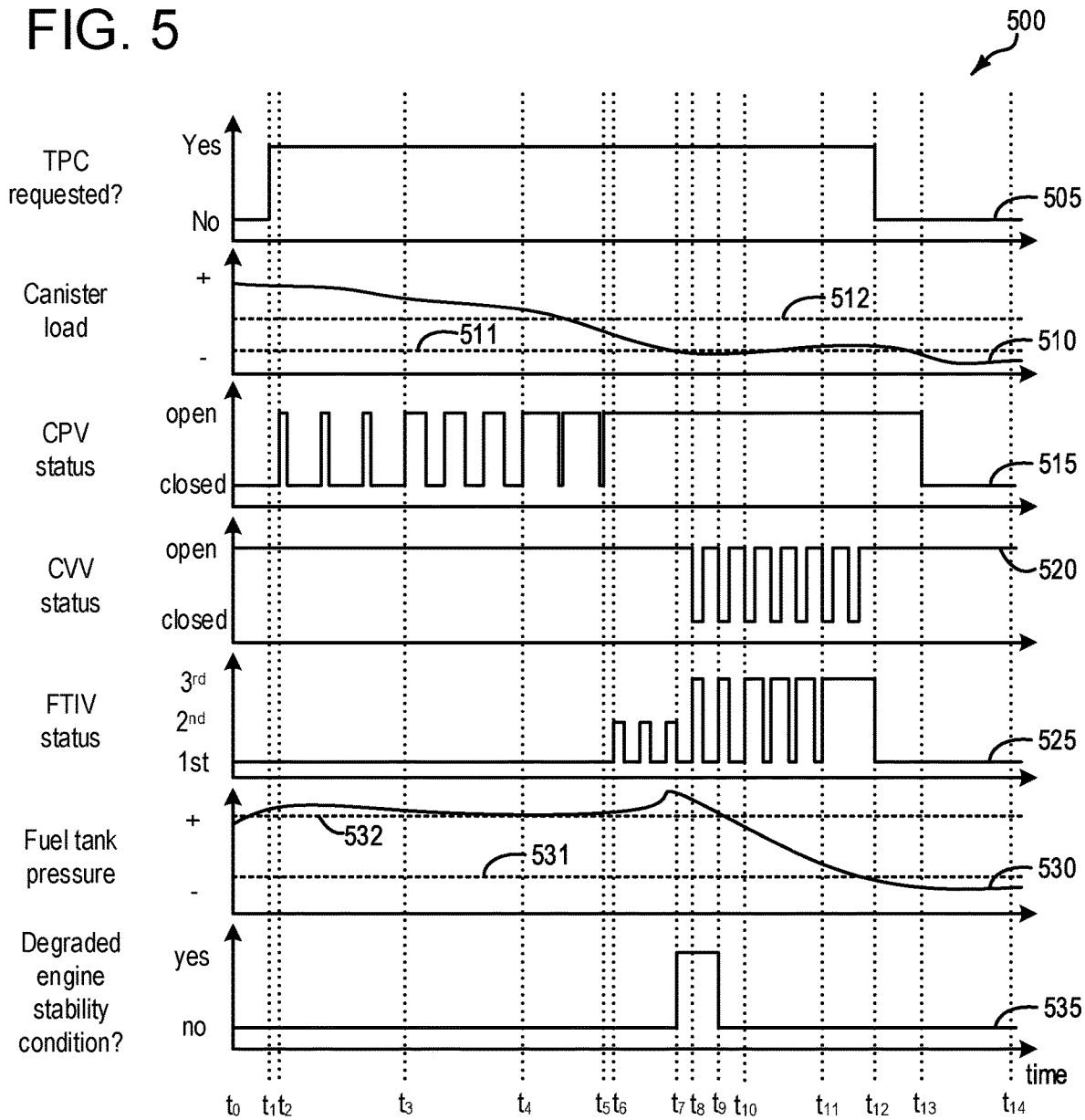
FIG. 5 depicts a timeline for controlling fuel vapor canister purging and fuel tank pressure control, according to the methods of FIGS. 3-4.

A method for conducting a TPC operation and/or a fuel vapor canister purging operation is depicted at FIG. 3. If, while conducting the TPC operation of FIG. 3 which includes routing the fuel vapors along the first flow path, a condition of degraded engine stability is detected, then the method may proceed to FIG. 4, where the fuel tank vapors are re-routed to the second flow path. In this way, a rate at which fuel tank vapors are inducted to the engine may be reduced, which may serve to mitigate the issue of degraded engine stability without aborting the TPC operation. An example timeline for controlling a TPC operation and canister purging operation according to the methods of FIGS. 3-4, is depicted at FIG. 5.

Figure 6:
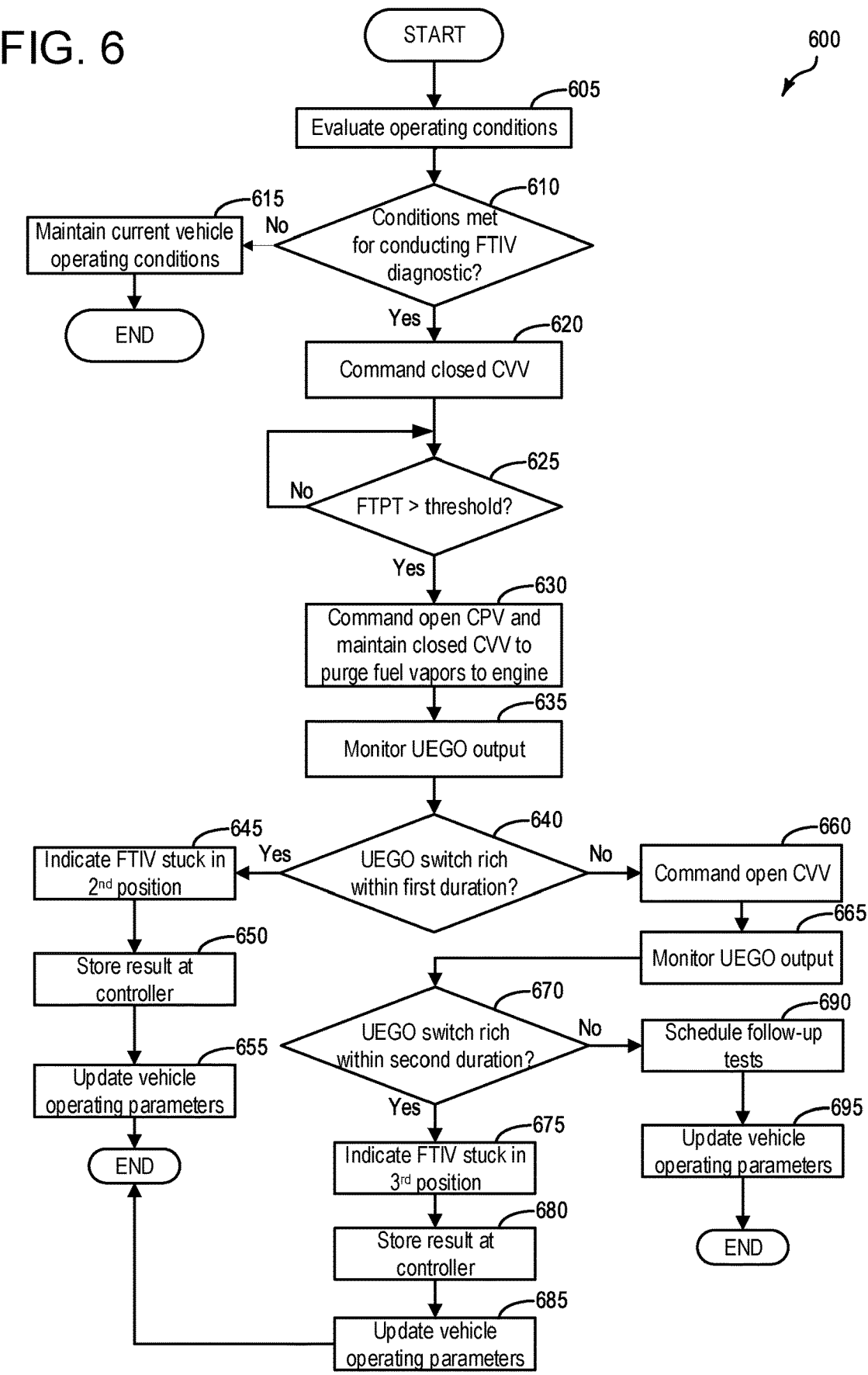
FIG. 6 depicts a flowchart for a high-level example method for conducting a diagnostic on a three-way fuel tank isolation valve.
Figure 7:
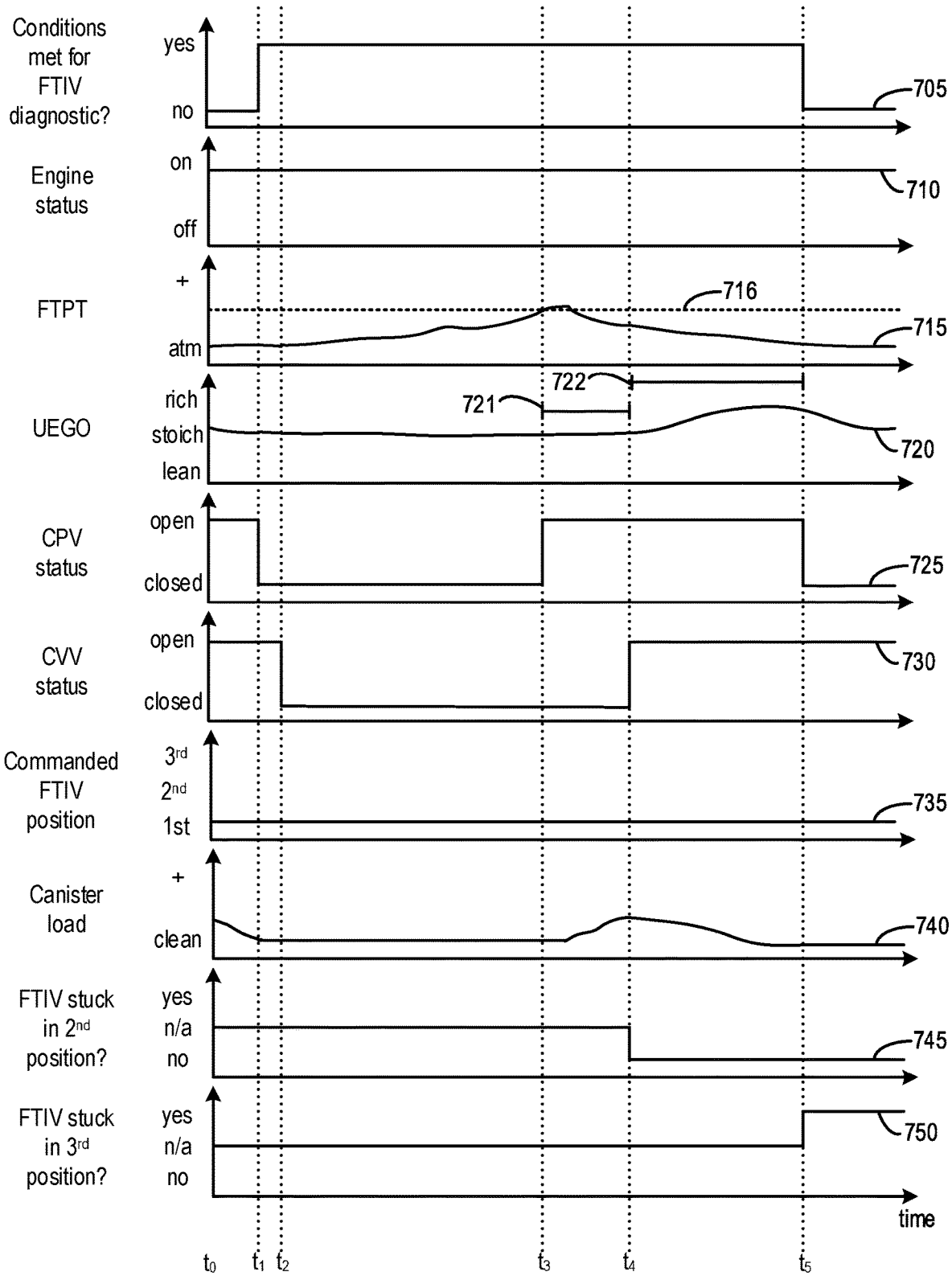
FIG. 7 depicts an example timeline for conducting the diagnostic of FIG. 6.
Figure 8:
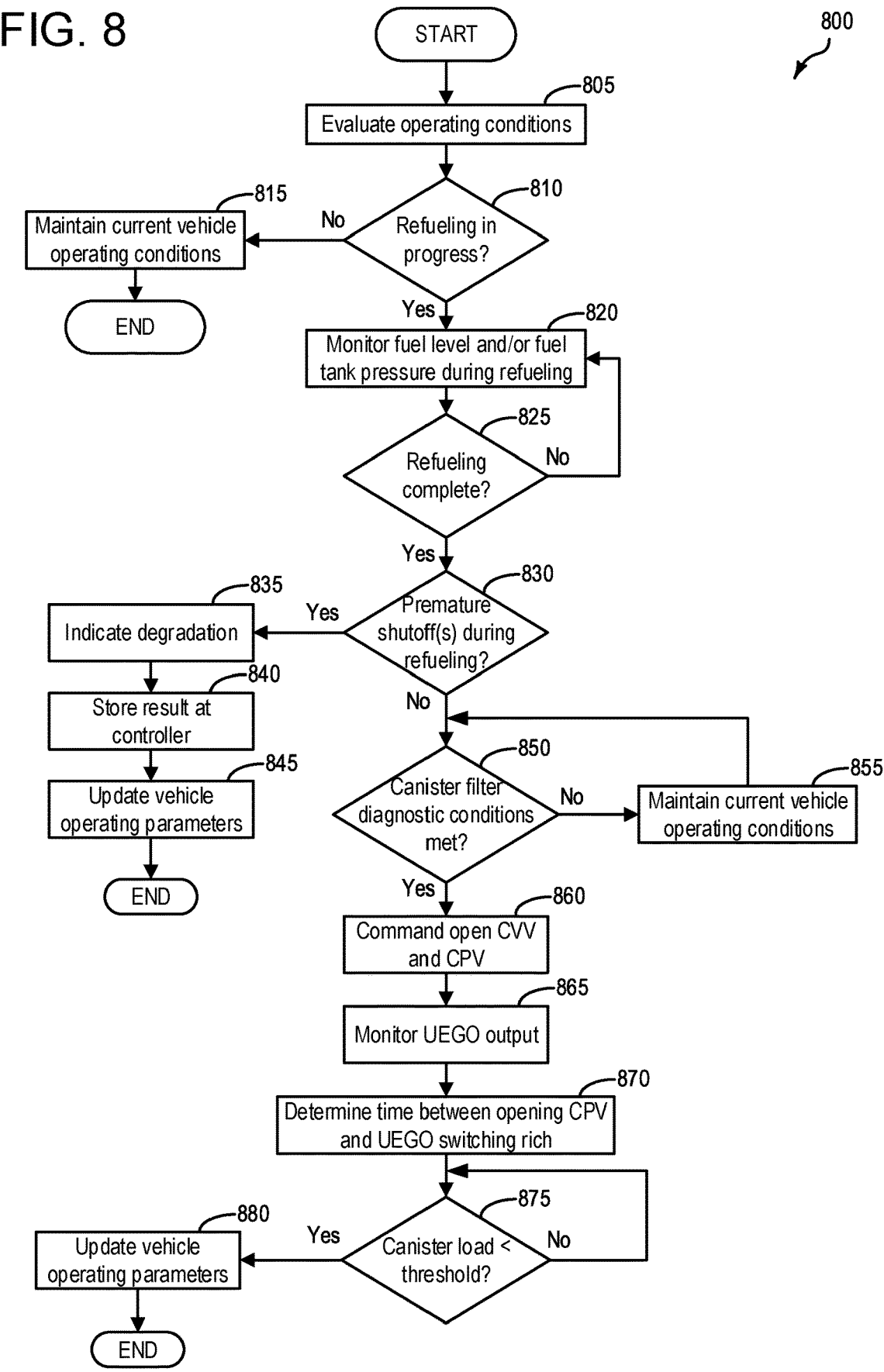
FIG. 8 depicts a flowchart for a high-level example method for determining an extent of clogging of a fuel vapor storage canister filter.
Figure 10:
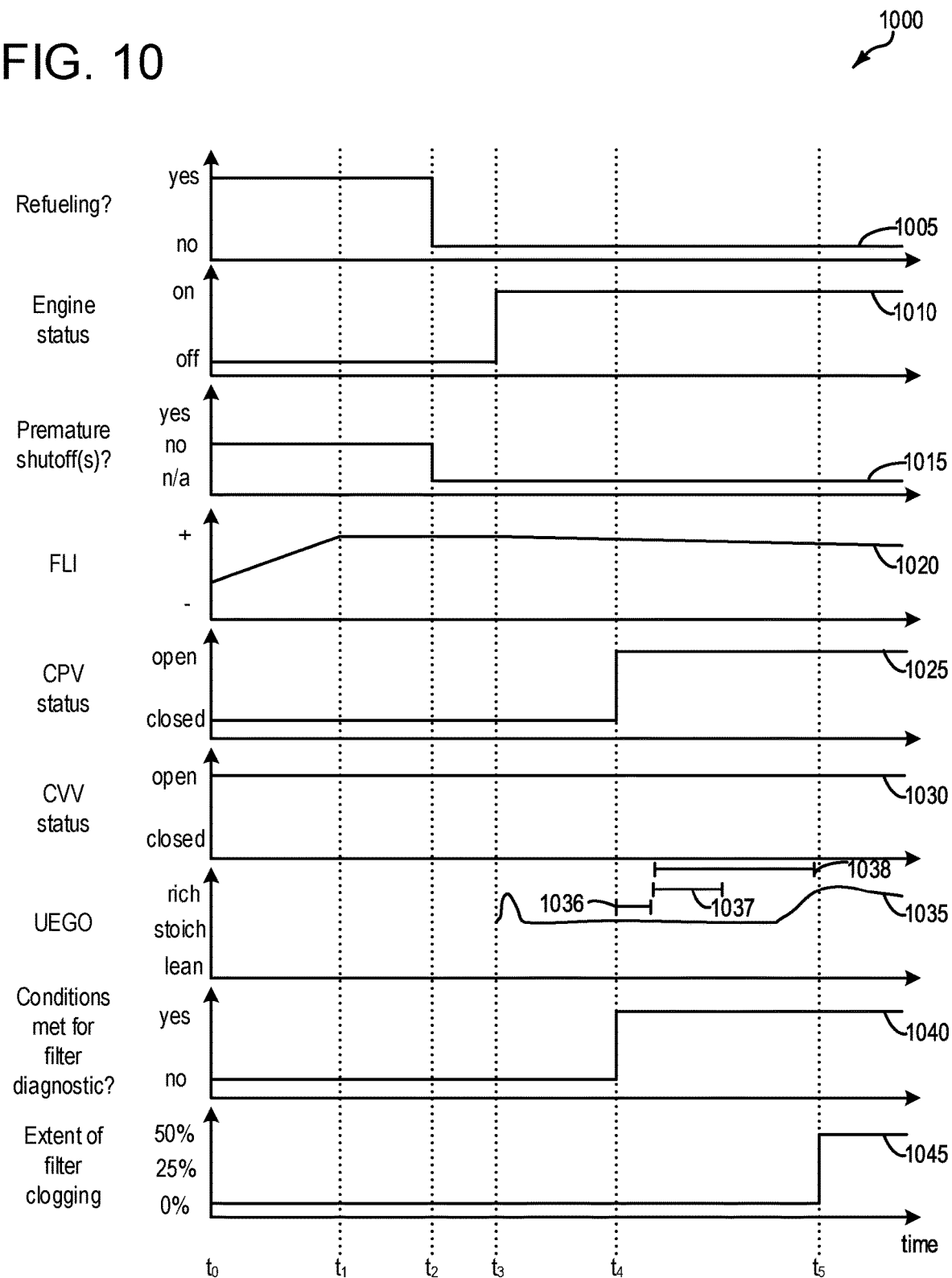
FIG. 10 depicts an example timeline for determining the extent of clogging of the fuel vapor storage canister filter according to the method of FIG. 8.
Figure 11:
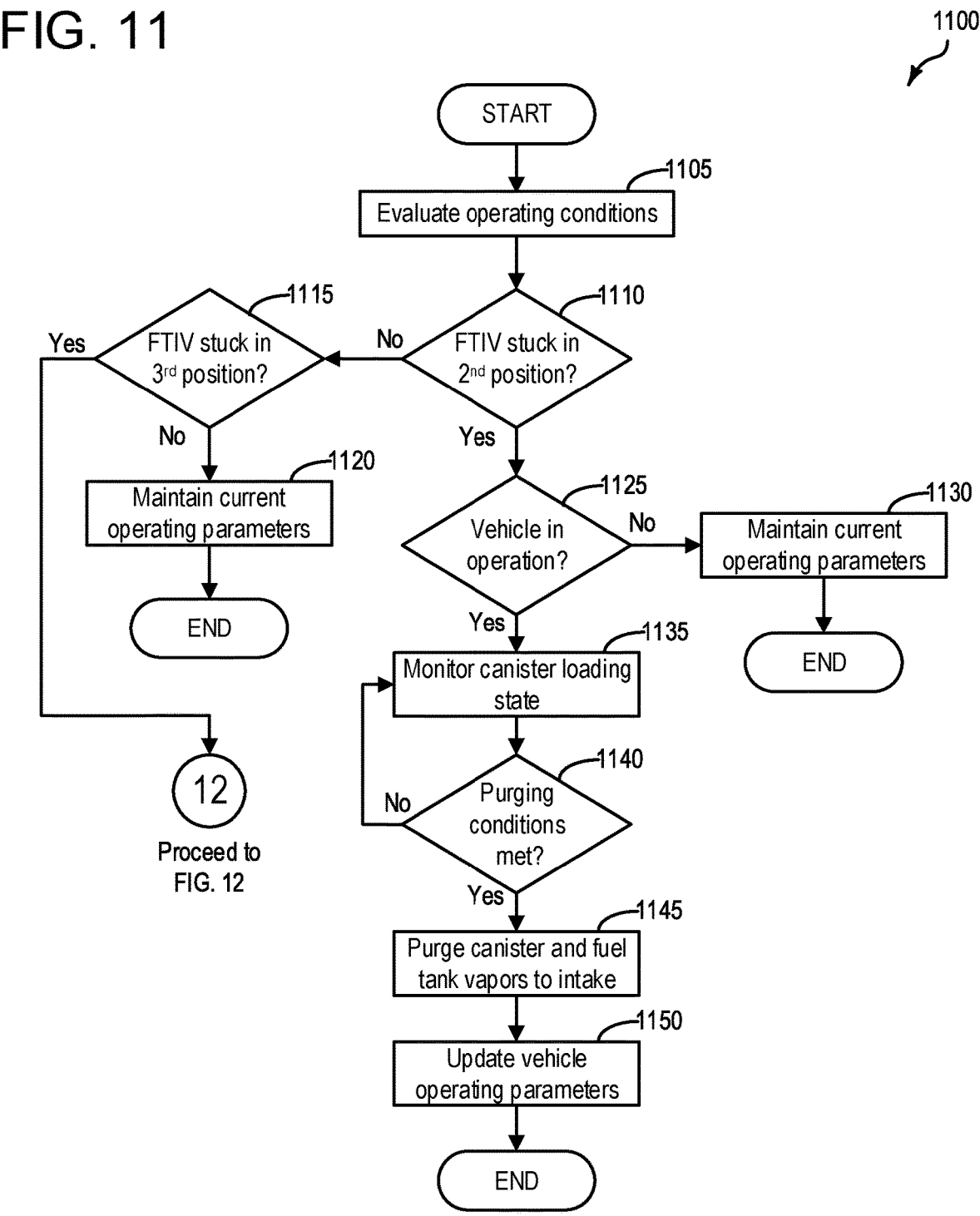
FIG. 11 depicts an example method for controlling evaporative emissions system component(s) in response to an indication of degradation of a fuel tank isolation valve.
Figure 12:
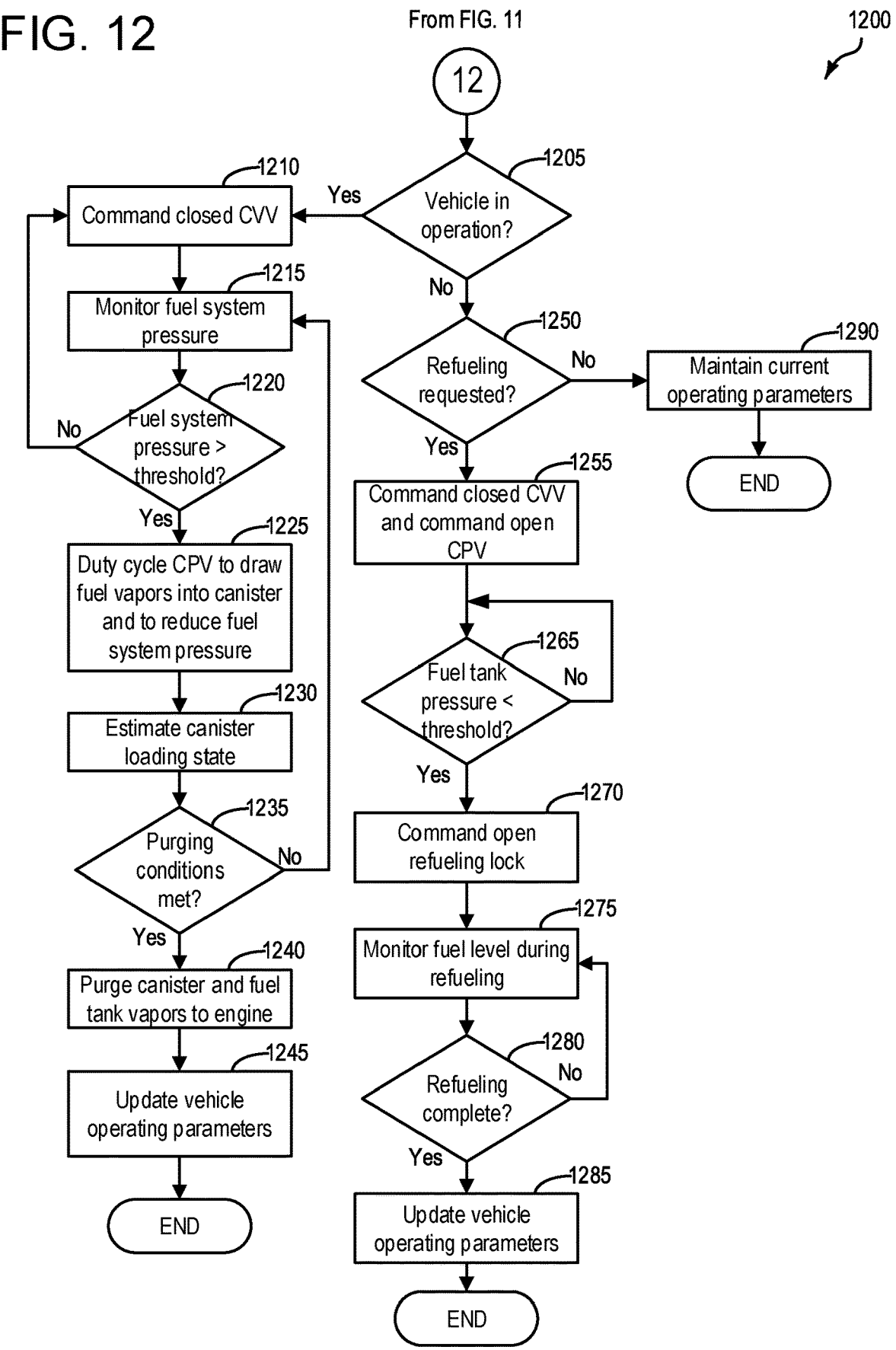
FIG. 12 continues from FIG. 11, and includes further steps for controlling evaporative emissions system component(s) in response to the indication of fuel tank isolation valve degradation.

Directing the fuel tank vapors to the engine via the first flow path or the second flow path may be accomplished via a three-way fuel tank isolation valve configurable in a closed position, a first open position, or a second open position. It is herein recognized that there may be circumstances where such a three-way fuel tank isolation valve may become stuck in the first open position or the second open position. Accordingly, FIG. 6 depicts an example method for diagnosing whether the fuel tank isolation valve is stuck in one of the first open position or the second open position. An example timeline depicting how the methodology of FIG. 6 may be used to infer whether the fuel tank isolation valve is stuck in the first open position or the second open position is illustrated at FIG. 7. It is further recognized that the diagnostic methodology of FIG. 6 may be dependent on an extent to which a canister filter positioned in the fuel vapor canister is clogged. Accordingly, a method for inferring an extent to which the canister filter is clogged is depicted at FIG. 8. Depending on the extent of canister filter clogging, particular parameters relied upon for use in the diagnostic of FIG. 6 may be updated, as depicted via a lookup table of FIG. 9. FIG. 10 depicts an example timeline depicting how the method of FIG. 8 may be used to infer the extent of canister filter degradation. An example method for taking mitigating action in response to an indication that the fuel tank isolation valve is stuck in either the first open position or the second open position is depicted at FIGS. 11-12.

Figure 1:
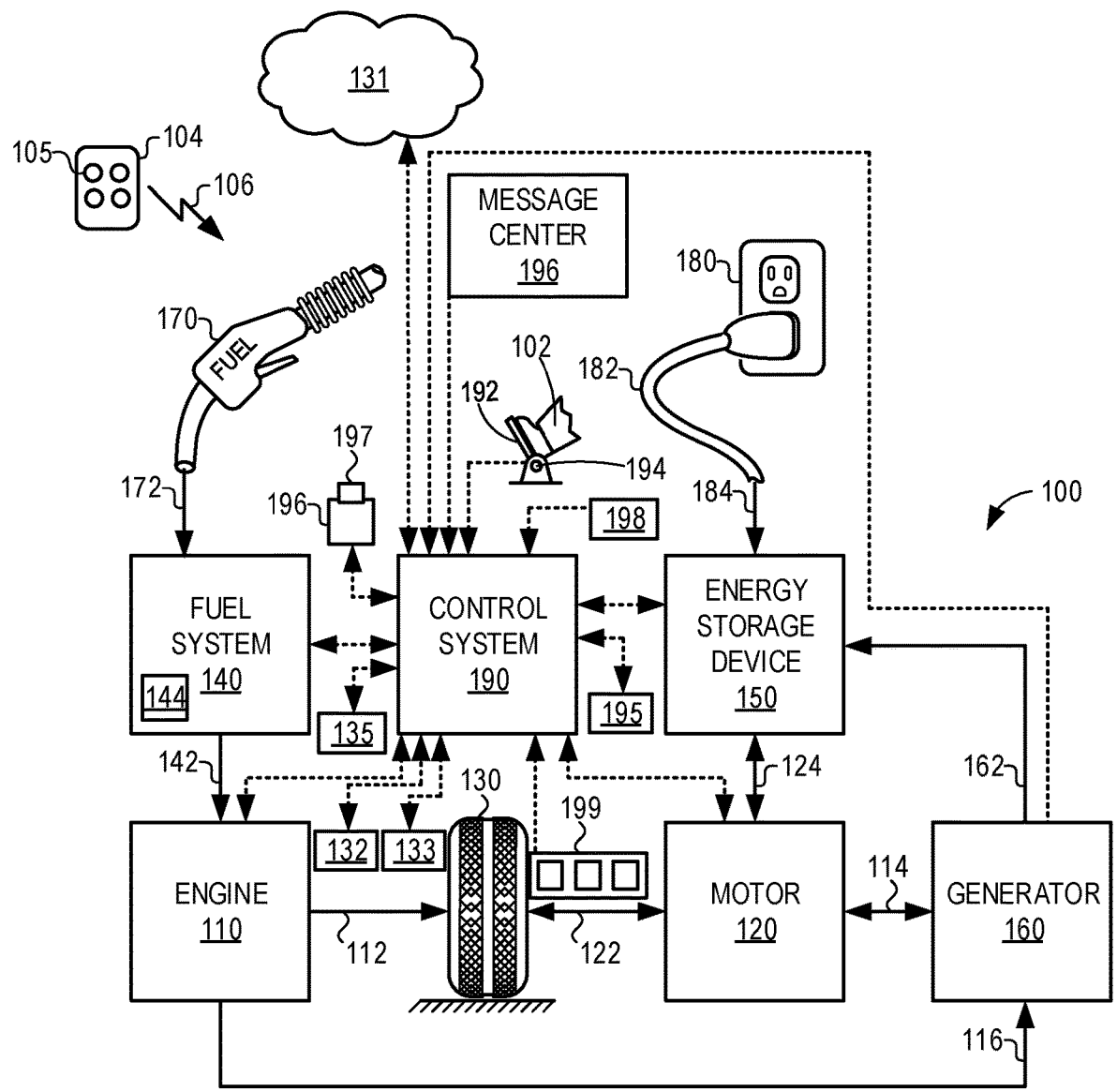
FIG. 1 schematically shows an example vehicle propulsion system.

Turning now to the figures, FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor (not shown at FIG. 1 but see FIG. 2). The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, or inertial sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In some examples, vehicle system 100 may include lasers, radar, sonar, acoustic sensors 133, which may enable vehicle location, traffic information, etc., to be collected via the vehicle.

Figure 2:
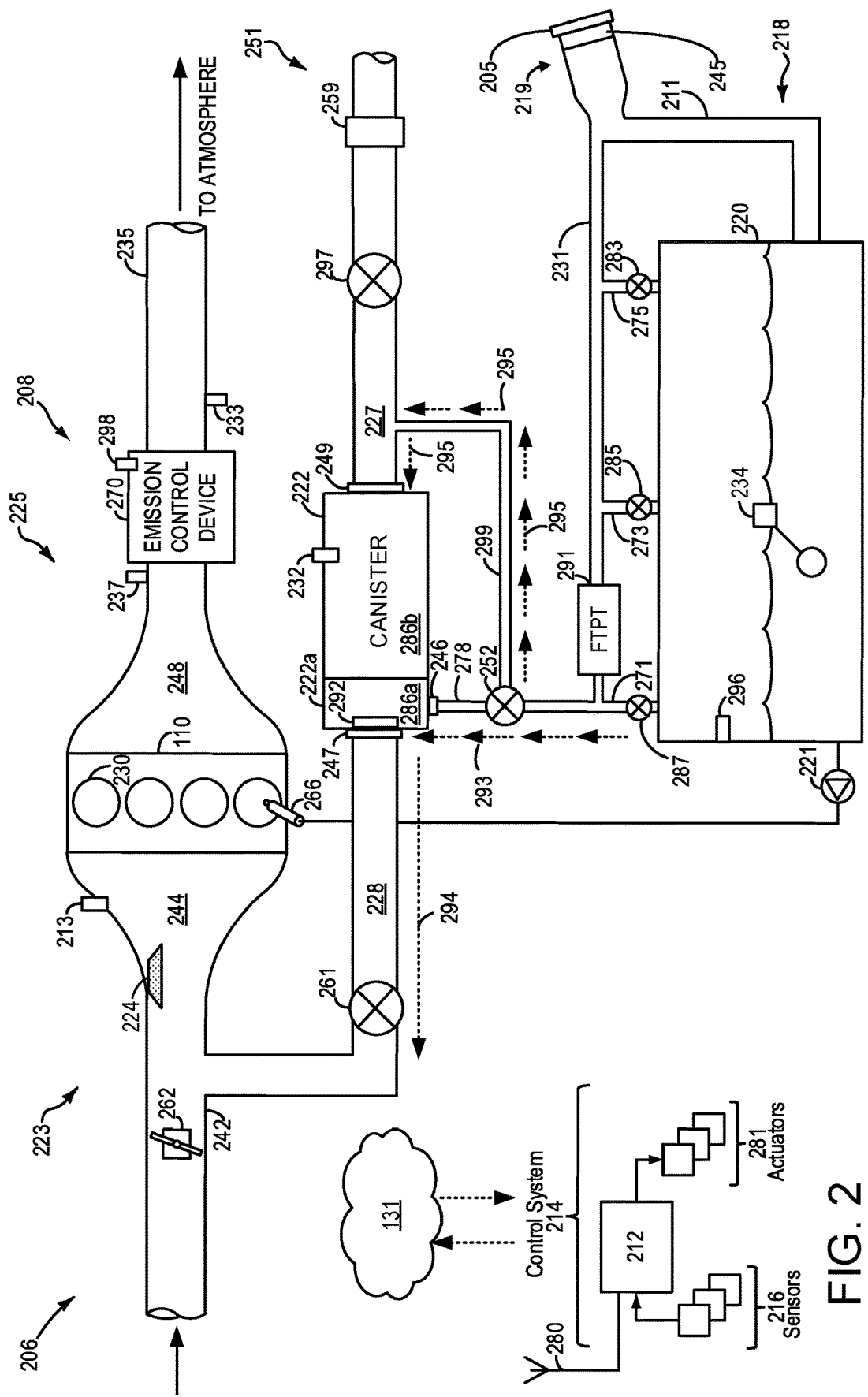
FIG. 2 schematically shows an example vehicle system with a fuel system and an evaporative emissions system.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system (evaporative emissions system) 251 and a fuel system 218. It may be understood that fuel system 218 may comprise the same fuel system as fuel system 140 depicted at FIG. 1. Emission control system 251 includes a fuel vapor container or canister 222 which may be used to capture and store fuel vapors. In some examples, vehicle system 206 may be a hybrid electric vehicle system. However, it may be understood that the description herein may refer to a non-hybrid vehicle, for example a vehicle equipped with an engine and not an motor that can operate to at least partially propel the vehicle, without departing from the scope of the present disclosure.

The engine system 208 may include an engine 110 having a plurality of cylinders 230. The engine 110 includes an engine air intake 223 and an engine exhaust 225. The engine air intake 223 includes a throttle 262 in fluidic communication with engine intake manifold 244 via an intake passage 242. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The engine exhaust system 225 may include one or more exhaust catalyst 270, which may be mounted in a close-coupled position in the exhaust. In some examples, an electric heater 298 may be coupled to the exhaust catalyst, and utilized to heat the exhaust catalyst to or beyond a predetermined temperature (e.g. light-off temperature). One or more emission control devices may include a three-way catalyst, lean NOx trap, diesel particulate filter, oxidation catalyst, etc. It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP.

An air intake system hydrocarbon trap (AIS HC) 224 may be placed in the intake manifold of engine 110 to adsorb fuel vapors emanating from unburned fuel in the intake manifold, puddled fuel from degraded injectors and/or fuel vapors in crankcase ventilation emissions during engine off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 110 is shut down.

Fuel system 218 may include a fuel tank 220 coupled to a fuel pump system 221. It may be understood that fuel tank 220 may comprise the same fuel tank as fuel tank 144 depicted above at FIG. 1. In some examples, the fuel system may include a fuel tank temperature sensor 296 for measuring or inferring a fuel temperature. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system (referred to herein as evaporative emissions system) 251 which includes a fuel vapor canister 222 via vapor recovery line 231, before being purged to the engine air intake 223. To reduce carbon dust migration from the canister, a canister filter 292 may be included in canister 222. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow the fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283.

Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

As discussed above, to reduce the time it takes to depressurize the fuel tank in response to a request for refueling (and to maintain pressure in the fuel tank within a predetermined range for fuel tank integrity reasons), pressure in the fuel tank may be periodically relieved during engine operation, where vapors released from the fuel tank are directed to engine intake for combustion. Such action is referred to as fuel tank pressure control (also referred to herein as tank pressure control, or TPC). TPC may involve duty cycling fuel tank isolation valve (FTIV) 252 while canister purge valve (CPV) 261 is commanded open or is additionally being duty cycled. In this way, fuel tank pressure may be maintained within a predetermined range, and fuel tank vapors may be routed to engine 110 for combustion, thereby improving fuel economy and reducing release of undesired evaporative emissions to atmosphere. As will be discussed in further detail below, there may be two routes whereby fuel tank vapors are directed to engine intake, depending on whether degraded engine stability is indicated during the TPC. Briefly, in an example where degradation of engine stability is not indicated, fuel tank vapors may be routed from fuel tank 220 to engine 110 as indicated via arrows 293 and 294. Alternatively, in response to an indication of degraded engine stability, fuel tank vapors may be routed from fuel tank 220 to engine 110 as indicated via arrows 295 and 294.

More specifically, it may be understood that FTIV 252 may comprise a three-way valve, where in a first configuration or first position, FTIV 252 may be understood to be closed, thus sealing the fuel tank 220 from fuel vapor canister 222. In a second configuration or second position, FTIV 252 may direct fuel tank vapors from fuel tank 220 to buffer region 222a of canister 222 via load port 246, and then to engine intake via purge port 247 and CPV 261 (refer to dashed arrows 293 and 294). In a third configuration or third position, FTIV 252 may direct fuel tank vapors along conduit 299 to vent line 227, through vent port 249 and an entirety (through adsorbent 286b and 286a) of canister 222 before exiting canister 222 via purge port 247 and being routed to engine intake via CPV 261 (refer to dashed arrows 295 and 294). In this way, in response to an indication of degraded engine stability while the fuel tank is being depressurized, fuel tank vapors may be redirected from being routed to engine intake via a first flow path (via load port 246 and purge port 247) to being routed through a second flow path (via vent port 249 and purge port 247). It may be understood that when fuel tank vapors are routed to engine intake via the first flow path, fuel tank vapors are routed through a buffer region 222a and not an entirety of canister 222, whereas when fuel tank vapors are routed to engine intake via the second flow path, fuel tank vapors are routed through the entirety of canister 222, including buffer region 222a. Such action of re-routing fuel tank vapors to pass through the entirety of canister 222 in response to an indication of degraded engine stability may reduce a rate at which fuel tank vapors are provided to the engine, which may thereby reduce a risk of engine hesitation and/or engine stall.

Continuing on, in some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222, as discussed. The fuel vapor canisters may be filled with an appropriate adsorbent 286b, such that the canisters are configured to temporarily trap fuel vapors (including vaporized hydrocarbons) during fuel tank refilling operations and during diagnostic routines, as will be discussed in detail below. In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and canister load may be estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve (CVV) 297 coupled within vent line 227. When included, the canister vent valve 297 may be a normally open valve. Fuel tank isolation valve (FTIV) 252 may be positioned between the fuel tank and the fuel vapor canister 222 within conduit 278. As discussed above, FTIV 252 may comprise a three-way valve, where in the first configuration, the FTIV is closed thus sealing the fuel tank from canister 222. Alternatively, in the second configuration, FTIV 252 may direct fuel tank vapors to canister 222 as indicated via dashed arrows 293. It may be understood that such a configuration (where CVV 297 is additionally commanded open and where CPV 261 is commanded closed) may be used during refueling events, such that fuel tank vapors may be directed to canister 222 for adsorption/storage. Such a configuration (e.g. second configuration) may alternatively be used during TPC operations where degradation of engine stability is not indicated, whereby fuel tank vapors may be directed along conduit 278 to buffer region 222a via load port 246, before being directed to engine intake via purge port 247 and CPV 261. Still further, FTIV 252 may be commanded to the third configuration during TPC operations where degradation of engine stability is indicated, such that fuel tank vapors are routed along conduit 299 to vent line 227. From vent line 227, fuel tank vapors may then be routed through vent port 249, through the entirety of canister 222 before exiting through purge port 247 and being directed to engine intake via CPV 261. Such action of re-routing fuel tank vapors in response to indications of engine stability degradation is discussed in further detail below with regard to the methods of FIGS. 3-4, and the timeline of FIG. 5.

Thus, as discussed, fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may command FTIV 252 to the second configuration while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may command FTIV 252 to the second configuration while maintaining canister purge valve 261 closed, to depressurize the fuel tank before allowing enabling fuel to be added therein. As such, FTIV 252 may be maintained in the second configuration during the refueling operation to allow refueling vapors to be stored in the canister. After refueling is completed, the FTIV may be commanded closed.

As yet another example, the fuel system may be operated in a canister purging mode (e.g., after an emission control device light-off temperature has been attained and with the engine combusting air and fuel), wherein the controller 212 may open or duty cycle CPV 261 while commanding FTIV 252 to the first configuration and commanding CVV 297 open. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. In some examples, purging may include additionally commanding FTIV to the second position, or duty cycling the FTIV from the first position to the second position, such that fuel vapors from the fuel tank may additionally be drawn into the engine for combustion. It may be understood that such purging of the canister further includes commanding or maintaining open CVV 297. In such an example, in response to an indication of degradation of engine stability, fuel tank vapors may be re-routed to vent line 227 as discussed above, by commanding FTIV 252 to the third configuration, or duty cycling FTIV 252 between the first configuration and the third configuration. Once in vent line 227, fuel tank vapors may then be directed through an entirety of canister 222 as discussed above, before being routed to the engine for combustion. Furthermore, as will be discussed in further detail below, in conjunction with the re-routing of fuel vapors through the entirety of the canister prior to being directed to engine intake, CVV 297 may be duty cycled which may increase a magnitude of vacuum directed across the canister for routing the fuel tank vapors in the vent line to engine intake.

Thus, CVV 297 may function to adjust a flow of air and vapors between canister 222 and the atmosphere, and may be controlled during or prior to purging, TPC and/or refueling routines. For example, the CVV may be opened during fuel vapor storing operations (for example, during fuel tank refueling) so that air, stripped of fuel vapor after having passed through the canister, can be pushed out to the atmosphere. Likewise, as mentioned above, during canister purging operations (for example, during canister regeneration and while the engine is running) the CVV may be opened to allow a flow of fresh air to strip the fuel vapors stored in the canister. Still further, the CVV may be commanded or maintained open during TPC operations, under conditions where FTIV 252 is being duty cycled between the first configuration and the second configuration. Alternatively, the CVV may be duty cycled between open and closed configurations during TPC operations under conditions where the FTIV 252 is being duty cycled between the first configuration and the third configuration.

In some examples, CVV 297 may be a solenoid valve wherein opening or closing of the valve is performed via actuation of a canister vent solenoid. In particular, the canister vent valve may be a normally open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed may be reduced.

Control system 214 is shown receiving information from a plurality of sensors 216 (various examples of which are described herein) and sending control signals to a plurality of actuators 281 (various examples of which are described herein). As one example, sensors 216 may include exhaust gas sensor 237 (e.g. universal exhaust gas oxygen sensor, heated exhaust gas oxygen sensor, etc.) located upstream of the emission control device 270, temperature sensor 233, pressure sensor 291, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297. Controller 212 may receive input data from the various sensors, process the input data, and trigger the actuators in response to the processed input data based on instruction or code programmed therein corresponding to one or more routines. Example control routines are described herein with regard to FIGS. 3-4, FIG. 6, FIG. 8, and FIGS. 11-12.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors, or via expiration of a timer set such that when the timer expires the controller is returned to the awake mode. In some examples, the opening of a vehicle door may trigger a return to an awake mode. In other examples, the controller may need to be awake in order to conduct such methods. In such an example, the controller may stay awake for a duration referred to as a time period where the controller is maintained awake to perform extended shutdown functions, such that the controller may be awake to conduct, for example, evaporative emissions test diagnostic routines.

Undesired evaporative emissions detection routines may be intermittently performed by controller 212 on fuel system 218 and/or evaporative emissions system 251 to confirm that undesired evaporative emissions are not present in the fuel system and/or evaporative emissions system. One example test diagnostic for undesired evaporative emissions includes application of engine manifold vacuum on the fuel system and/or evaporative emissions system that is otherwise sealed from atmosphere, and in response to a threshold vacuum being reached, sealing the evaporative emissions system from the engine and monitoring pressure bleed-up in the evaporative emissions system to ascertain a presence or absence of undesired evaporative emissions. In some examples, engine manifold vacuum may be applied to the fuel system and/or evaporative emissions system while the engine is combusting air and fuel. In other examples, the engine may be commanded to be rotated unfueled in a forward direction (e.g. the same direction the engine rotates when combusting air and fuel) to impart a vacuum on the fuel system and/or evaporative emissions system. In still other examples, a pump (not shown) positioned in vent line 227 may be relied upon for applying a vacuum on the fuel system and/or evaporative emissions system.

Controller 212 may further include wireless communication device 280, to enable wireless communication between the vehicle and other vehicles or infrastructures, via wireless network 131.

Thus, discussed herein a system for a hybrid vehicle may comprise a a fuel tank that is selectively fluidically coupled to an evaporative emissions system that includes a fuel vapor canister via a three-way fuel tank isolation valve, the fuel vapor canister further selectively fluidically coupled to an engine via a canister purge valve. Such a system may further include a controller with computer readable instructions stored on non-transitory memory that when executed while the engine is operating to combust air and fuel, cause the controller to reduce a pressure in the fuel tank by controlling the fuel tank isolation valve to direct fuel tank vapors through a portion of the fuel vapor canister and then to the engine under conditions of an absence of degraded stability of the engine. The controller may store further instructions to reduce the pressure in the fuel tank by controlling the fuel tank isolation valve to direct the fuel tank vapors through an entirety of the fuel vapor canister and then to the engine under conditions of a presence of degraded stability of the engine.

For such a system, the fuel vapor canister may further comprise a buffer region. In such an example, controlling the fuel tank isolation valve to direct the fuel tank vapors through the portion of the fuel vapor canister may include directing the fuel tank vapors to the buffer region and then to the engine.

For such a system, the system may further comprise a vent line positioned upstream of the fuel vapor canister, between the fuel vapor canister and atmosphere, the vent line including a canister vent valve. In such an example, controlling the fuel tank isolation valve to direct the fuel tank vapors through the entirety of the fuel vapor canister and then to the engine may include directing the fuel tank vapors to the vent line at a position between the fuel vapor canister and the canister vent valve.

For such a system, the controller may store further instructions to command fully open the canister vent valve without duty cycling the canister vent valve for reducing the pressure in the fuel tank by controlling the fuel tank isolation valve to direct the fuel tank vapors through the portion of the fuel vapor canister and then to the engine. The controller may store further instructions to duty cycle the canister vent valve at a predetermined duty cycle for reducing the pressure in the fuel tank by controlling the fuel tank isolation valve to direct the fuel tank vapors through the entirety of the fuel vapor canister and then to the engine.

For such a system, the controller may store further instructions to fluidically couple the engine to the fuel vapor canister by controlling a duty cycle of the canister purge valve while reducing the pressure in the fuel tank by either controlling the fuel tank isolation valve to direct fuel tank vapors through the portion or through the entirety of the fuel vapor canister.

Another example of a system for a vehicle as discussed herein may comprise a fuel tank isolation valve positioned in a load conduit between a fuel tank and a fuel vapor storage canister, the fuel tank isolation valve configurable in a first position, a second position, and a third position, the first position comprising a closed position, the second position comprising a first open position, and the third position comprising a second open position. Such a system may further comprise an exhaust gas sensor positioned in an exhaust passage of an engine. Such a system may further comprise a controller with computer readable instructions stored on non-transitory memory that when executed cause the controller to, responsive to an indication that the fuel tank isolation valve is not adopting the first position when commanded to do so, conduct a diagnostic to determine whether the fuel tank isolation valve is stuck in the first open position or the second open position, the diagnostic based on a time frame in which fuel vapors stemming from the fuel tank are routed to an engine as monitored via output from the exhaust gas sensor.

For such a system, the system may further comprise a canister purge valve that regulates a flow of fuel vapors from the fuel tank to the engine. In such an example, the controller may store further instructions to command the canister purge valve open for routing the fuel vapors to the engine.

For such a system, the system may further comprise a canister vent valve positioned in a vent line stemming from the fuel vapor storage canister. In such an example, the controller may store further instructions to indicate that the fuel tank isolation valve is stuck in the first open position in response to the time frame comprising a first time frame that is shorter than a second time frame, and indicate that the fuel tank isolation valve is stuck in the second open position in response to the time frame comprising the second time frame. The canister vent valve may be commanded closed during the first time frame and may be commanded open during the second time frame.

For such a system, the system may further comprise a canister filter. In such an example, the controller may store further instructions to adjust the first time frame and the second time frame as a function of an extent to which the canister filter is inferred to be clogged.

For such a system, the controller may store further instructions to command the fuel tank isolation valve to the first position for conducting the diagnostic.

Turning now to FIG. 3, a high-level flowchart for an example method 300 for controlling purging of the fuel vapor canister (e.g. 222) and/or conducting a TPC (fuel tank pressure control) operation, is shown. More specifically, method 300 includes determining whether conditions are met for conducting a TPC operation. If conditions are met, method 300 includes conducting such an operation and monitoring engine stability such that in an event where degradation of engine stability is indicated, fuel vapors from the fuel tank may be re-routed to pass through an entirety of the fuel vapor canister (e.g. 222 and 222a) rather than being directed through just a portion (e.g. buffer region 222a) of the canister and not the entirety of the canister. In this way, discontinuation of purging control and tank pressure control in response to degradation of engine stability may be avoided, which may at least 1) improve issues related to fuel tank depressurization in response to refueling requests, 2) reduce fuel tank degradation, and 3) reduce release of undesired evaporative emissions to the environment.

Method 300 will be described with reference to the systems described herein and shown in FIGS. 1-2, though it will be appreciated that similar methods may be applied to other systems without departing from the scope of this disclosure. Instructions for carrying out method 300 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-2. The controller may employ actuators such as motor/generator (e.g. 120), CPV (e.g. 261), FTIV (e.g. 252), CVV (e.g. 297), etc., according to the methods described herein.

Method 300 begins at 303, and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 306, method 300 includes indicating whether TPC is requested. Specifically, the controller (e.g. 212) of the vehicle may receive such a request in response to pressure in the fuel tank (e.g. 220) being greater than a first predetermined fuel tank pressure threshold. In some examples, such a request may further comprise an indication that such pressure has been at or above the predetermined fuel tank pressure threshold for more than a predetermined duration. If, at 306, TPC is not indicated to be requested, method 300 may proceed to 309. At 309, method 300 may include indicating whether conditions are met for purging the canister (e.g. 222) of stored fuel vapors. Conditions being met at 309 may include an indication that a canister loading state is above a canister purge threshold. The canister purge threshold may comprise a canister loading state which may be understood to be saturated, or nearly saturated (e.g. greater than 80% loaded, greater than 85% loaded, greater than 90% loaded, greater than 95% loaded, etc.) However, in some examples, conditions may be indicated to be met for canister purging even if the canister is not saturated or nearly so, for example under conditions where the canister is 30% loaded or greater, 40% loaded or greater, 50% loaded or greater, etc.

Conditions being indicated to be met at 309 may further include an indication of an engine intake manifold vacuum (e.g. negative pressure with respect to atmospheric pressure) greater than a predetermined intake manifold vacuum. It may be understood that the predetermined intake manifold vacuum may comprise a negative pressure sufficient for efficiently purging the canister of stored fuel vapors to engine intake. Conditions being met at 309 may in some examples additionally or alternatively include an indication of an absence of a degraded engine stability issue. Conditions being met at 309 may still further include an indication that a temperature of the exhaust catalyst is greater than a predetermined operating temperature (e.g. light-off temperature).

If, at 309, conditions are not indicated to be met for conducting the canister purging operation, method 300 may proceed to 312. At 312, method 300 includes maintaining current vehicle operating conditions. Specifically, if the engine is in operation, such operation may be maintained while maintaining the CPV (e.g. 261) closed. If the vehicle is being propelled at least in part via electrical energy, such operation may be maintained while maintaining the CPV closed. Method 300 may then end.

Returning to 309, in response to an indication that conditions are met for conducting the canister purging operation but not for conducting the TPC operation, method 300 may proceed to 315. At 315, method 300 may include commanding or maintaining closed the FTIV. In other words, the FTIV may be commanded or maintained in the first position, thus sealing the fuel tank from the canister.

Proceeding to 318, method 300 includes purging the canister by sequentially increasing a duty cycle of the CPV over time, in response to an indication of a concentration of fuel vapors being desorbed from the canister. More specifically, at 318, method 300 includes commanding open or maintaining open the CVV, and initiating purging of the canister by commanding an initial duty cycle of the CPV. For example, the initial duty cycle may include a duty cycle whereby the CPV spends a greater portion of time in a closed state, with brief transitions to the open state. By duty cycling the CPV, intake manifold vacuum may be directed at the canister, whereby fresh air drawn into the vent line may be further drawn across the canister, desorbing stored fuel vapors from the canister and routing them to the engine for combustion.

While the CPV is being duty cycled, the concentration of fuel vapors being inducted to the engine from the canister may be indicated based on feedback received from the exhaust gas oxygen sensor (e.g. 237). Such feedback may be assessed by the vehicle controller in determining when and by how much to increase the CPV duty cycle over time. In this way, the CPV duty cycle may be sequentially increased over time as a function of the inferred amount of fuel vapors being inducted to the engine for combustion, such that a desired engine air-fuel ratio may be maintained during the process of purging the canister of stored fuel vapors while avoiding engine instability conditions. The purging process may be stopped or aborted once it is indicated that the canister is substantially free of fuel vapors, as will be discussed in further detail below.

Accordingly, proceeding to 321, method 300 may include indicating whether the canister loading state is below a first threshold loading state. It may be understood that the first threshold loading state may comprise a loading state where the canister is substantially free of stored fuel vapors (e.g. 5% loaded or less). If the canister loading state has not yet dropped below the first threshold loading state, then method 300 may return to 318, where the purging operation may continue as discussed where the CPV duty cycle is sequentially increased over time as a function of fuel vapor concentration being routed to engine intake.

Returning to 321, in response to the canister load being indicated to be below the first threshold loading state, method 300 may proceed to 324. At 324, method 300 may include discontinuing the purging of the canister by commanding closed the CPV. By commanding closed the CPV, it may be understood that the canister is sealed off from engine intake such that intake manifold vacuum is no longer being directed at the canister.

With purging discontinued, method 300 may proceed to 327. At 327, method 300 may include updating vehicle operating parameters. For example, a canister loading state may be updated to reflect the canister purging operation, and a canister purging schedule may be updated as a function of the recently conducted canister purging operation. Method 300 may then end.

Returning to 306, in the event that TPC is requested, method 300 may proceed to 330. At 330, method 300 may include indicating whether the canister loading state is greater than the first threshold loading state. The first threshold loading state, as discussed with regard to step 321 of method 300, may comprise a canister that is substantially free (e.g. loaded to less than 5%) of stored fuel vapors. The canister may be substantially free of stored fuel vapors if a prior canister purging operation has been conducted, and the vehicle has not undergone a refueling operation which may load the canister with fuel vapors since the prior purging operation was conducted. If, at 330, it is indicated that the canister loading state is below the first threshold loading state, then method 300 may proceed to 333. At 333, method 300 may include commanding the CPV to a 100% duty cycle. In other words, at 333, the CPV may be commanded fully open, without periodically closing the CPV. If the canister were not substantially free of stored fuel vapors, then immediately commanding the CPV to the 100% duty cycle may result in an amount of fuel vapors inducted to the engine which may result in engine stability issues. In other words, the amount of vapors inducted may be such that engine hesitation and/or engine stall may result if the CPV were commanded fully open without ramping up the CPV duty cycle as a function of learned concentration of fuel vapor being inducted to the engine, as discussed above with regard to step 318 of method 300. However, because the canister is substantially clean, the CPV may be commanded to the 100% duty cycle without concern that doing so may result in engine stability issues.

Accordingly, with the CPV commanded fully open at 333, method 300 may proceed to 336. At 336, method 300 may include depressurizing the fuel tank by sequentially increasing the FTIV duty cycle as a function of a learned concentration of fuel vapors being inducted to the engine from the fuel tank depressurization operation. More specifically, at 336, method 300 may include controlling the FTIV by duty cycling the FTIV between the first position and the second position, such that fuel vapors are directed or routed to engine intake via the first flow path (see arrows 293 and 294). Said another way, by duty cycling the FTIV between the first position and the second position, fuel tank vapors may be released from the fuel tank, and routed through the buffer region (e.g. 222a) of the canister via the load port (e.g. 246) and the purge port (e.g. 247) before being routed along the purge line (e.g. 228) to the engine for combustion.

Similar to that discussed above with regard to step 318 of method 300, the FTIV may initially be duty cycled at a lower duty cycle, and the duty cycle may be sequentially ramped up over time as a function of learned fuel vapor concentration stemming from the fuel tank. The fuel vapor concentration stemming from the fuel tank may be learned based on output from the exhaust gas oxygen sensor (e.g. 237), similar to the methodology utilized to infer fuel vapor concentration stemming from the canister during a canister purging operation.

However, although duty cycling of the FTIV as a function of learned fuel vapor concentration may serve to regulate an amount of fuel vapors directed to the engine during the fuel tank depressurization (or in other words, during the TPC operation), there may be circumstances whereby an amount of fuel vapors inducted to the engine is greater than expected or predicted. Such circumstances may be referred to as a vapor slug inducted to the engine. Such vapor slugs may lead to a degraded engine stability condition, or in other words, may lead to engine hesitation and/or engine stall. A vapor slug may occur in response to fuel in the fuel tank being greater than a predetermined fuel temperature and further in response to an event that results in fuel slosh within the tank. For example, a vehicle turning maneuver may result in fuel slosh, and if the temperature of the fuel in the fuel tank is greater than the predetermined fuel temperature, then resultant vaporization may result in a greater than expected amount of fuel vapors being inducted to the engine. Furthermore, when conducting such TPC operations, the concentration of fuel vapor stemming from the fuel tank may not be known until sufficient time has passed during the TPC operation for the controller to learn the concentration of fuel vapor stemming from the engine. Prior to learning the concentration, the duty cycle of the FTIV may be such that the amount of fuel vapor being inducted to the engine is sufficient to result in a degraded engine stability condition, depending on variables such as fuel temperature, presence or absence of fuel slosh, fuel level, reid vapor pressure of the fuel in the fuel tank, etc.

Accordingly, with the FTIV being duty cycled between the first position and the second position such that fuel vapors are routed to the engine via the first flow path, method 300 may proceed to 339. At 339, method 300 may include indicating whether a condition of degraded engine stability is inferred via the vehicle controller. A condition of degraded engine stability may be indicated in some examples based on a sudden increase or spike in fuel tank pressure, monitored for example via the FTPT (e.g. 291). More specifically, a sudden increase in fuel tank pressure greater than a predetermined threshold fuel tank pressure increase may be indicative of a potential for degraded engine stability, as such an increase may result in a greater than expected amount of fuel vapors being inducted to the engine. In some examples, output from one or more vehicle inertial sensor(s) (e.g. 199) may be relied upon for inferring whether a particular vehicle maneuver (e.g. vehicle maneuver resulting in fuel slosh) may be responsible for the sudden increase in fuel tank pressure. Such an inference may additionally or alternatively be based on output from the fuel level sensor (e.g. 234). For example, if fuel level rapidly changes, then it may be inferred via the controller that a fuel slosh event has occurred, and that a condition of degraded engine stability may result. In another example, the degraded engine stability condition may be inferred based on a particular change (e.g. direction and magnitude) in vehicle speed over time. For example, vehicle speed may drop (e.g. become slower) in response to a vapor slug by the engine that results in engine hesitation. Thus, in response to a drop in vehicle speed greater than a predetermined threshold speed decrease, a condition of degraded engine stability may be indicated. Alternatively, in other examples the vehicle may experience a surge in vehicle speed in response to a vapor slug, such that an increase in vehicle speed greater than a predetermined threshold speed increase may be indicative of degraded engine stability.

In response to an indication of a degraded engine stability condition or potential for a degraded engine stability condition, method 300 may proceed to FIG. 4, where method 400 may be used to re-route fuel vapors stemming from the fuel tank to the vent line (e.g. 227), and then through an entirety of the canister en route to engine intake. In this way, TPC may continue without aborting the routine, which may be particularly advantageous for hybrid vehicles with reduced engine run-time, such as the hybrid vehicle discussed with regard to FIG. 1. Method 400 will be discussed in further detail below.

Alternatively, in response to an indication of an absence of a degraded engine stability condition, method 300 may proceed to 342. At 342, method 300 may include indicating whether pressure in the fuel tank is below a second predetermined fuel tank pressure threshold. Specifically, the second predetermined fuel tank pressure threshold may be a predetermined amount lower (e.g. closer to atmospheric pressure) than the first predetermined fuel tank pressure threshold (see step 306 of method 300). If, at 342, fuel tank pressure has not decreased to below the second predetermined fuel tank pressure threshold, then method 300 may return to 336, where the fuel tank may continue to be depressurized by duty cycling the FTIV between the first position and the second position, where such duty cycling is sequentially ramped up over time as a function of the learned concentration of fuel vapors being inducted to the engine from the fuel tank depressurization routine. The controller may continue to assess, at 339, whether a condition of degraded engine stability is indicated, or not.

In response to fuel tank pressure decreasing to below the second predetermined fuel tank pressure threshold, method 300 may proceed to 345. At 345, method 300 may include discontinuing the TPC operation by commanding fully closed the CPV, and by additionally commanding fully closed the FTIV. In other words, the FTIV may be commanded to the first position, thus sealing the fuel tank from the canister, where the canister is additionally sealed from engine intake via the closing of the CPV.

Proceeding to 348, method 300 may include updating vehicle operating parameters. For example, current fuel tank pressure may be recorded at the controller, reflecting the recent TPC routine. Method 300 may then end.

Returning to 330, responsive to TPC being requested at 306, and further responsive to canister load being greater than the first threshold loading state or in other words, in response to an indication that the canister is not substantially clean of fuel vapors, method 300 may proceed to 351. While not explicitly illustrated, in some examples method 300 may proceed to 351 when canister load is greater than the first threshold loading state, and is further greater than a second threshold loading state, the second threshold loading state greater than the first threshold loading state (see step 357 below). At 351, method 300 may include commanding or maintaining closed the FTIV. In other words, the FTIV may be commanded or maintained in the first position. In this way, the fuel tank may be sealed from the canister.

Proceeding to 354, method 300 may include purging the canister to engine intake by sequentially increasing the duty cycle of the CPV over time, as a function of a learned fuel vapor concentration stemming from the canister. It may be understood that step 354 is substantially the same as step 318 of method 300, and thus will not be further elaborated for brevity. However, it may be understood that based on the learned concentration of fuel vapors stemming from the canister, canister load may be inferred by the vehicle controller.

Accordingly, proceeding to 357, method 300 may include indicating whether the canister loading state is less than the second threshold loading state. In some examples, the second threshold loading state may comprise a same loading state as the first predetermined threshold loading state. However, in other examples, the second threshold loading state may comprise a loading state a predetermined amount greater than the first threshold loading state.

If, at 357, the canister loading state is not indicated to be less than the second threshold loading state, method 300 may return to 354, where the canister may continue to be purged as discussed above, with sequential ramping up of the CPV duty cycle over time as a function of the learned fuel vapor concentration stemming from the canister.

Alternatively, in response to the canister load being indicated to be below the second threshold loading state, method 300 may proceed to 360. At 360, method 300 may include commanding/maintaining the CPV duty cycle at a desired duty cycle. In some examples, for example where the second threshold loading state is substantially similar to the first threshold loading state, the CPV duty cycle commanded and/or maintained at 360 may comprise a 100% duty cycle. In other words, because the canister has reached a point of being substantially free of fuel vapors, the CPV may be commanded to the 100% duty cycle, or may be maintained at the 100% duty cycle, without concern that an undesirable amount of fuel vapors are going to be inducted to the engine from the canister. In other examples where the second threshold loading state is greater than the first threshold loading state, the CPV may not be at the 100% duty cycle at the time when the canister load drops below the second threshold loading state. In such an example, the CPV may be maintained duty cycled at the current CPV duty cycle. In still other examples, depending on how much greater the second threshold loading state is than the first threshold loading state, the CPV may potentially be commanded to the 100% duty cycle at step 360, responsive to canister load dropping below the second threshold loading state. For example, the CPV may be commanded to the 100% duty cycle under situations where the second threshold loading state is such that it is unlikely that a condition of degraded engine stability may result from stepping the CPV to the 100% duty cycle at 360.

With the CPV commanded or maintained at the desired duty cycle at 360, method 300 may proceed to 363. At 363, method 300 may include conducting the TPC operation by commanding an initial duty cycle of the FTIV, where the FTIV duty cycle involves cycling between the first position and the second position, such that vapors from the fuel tank are directed to engine intake along the first flow path. Similar to that discussed above with regard to step 336 of method 300, the duty cycle of the FTIV may be sequentially increased as a function of a learned concentration of fuel vapors being inducted to the engine from the fuel tank.

With the FTIV being duty cycled between the first position and the second position, method 300 may proceed to 366. At 366, method 300 may include indicating whether a condition of degraded engine stability is indicated. Conditions for indicating such a situation have been discussed above in detail with regard to step 339 of method 300, and thus for brevity will not be reiterated here.

In response to an indication of the degraded engine stability condition, method 300 may proceed to FIG. 4 where, as mentioned above, the fuel vapors stemming from the fuel tank may be re-routed such that they are directed first to the vent line (e.g. 227) stemming from the canister, and then through the entirety of the canister en route to engine intake. Such methodology with regard to FIG. 4 will be discussed in further detail below.

Alternatively, in response to an indication of an absence of the condition of degraded engine stability, method 300 may proceed to 369, where it is indicated whether pressure in the fuel tank is below the second fuel tank pressure threshold, discussed in detail above with regard to step 342. If fuel tank pressure has not yet dropped to below the second fuel tank pressure threshold, method 300 may return to 363, where the fuel tank may continue to be depressurized by sequentially increasing the duty cycle of the FTIV (between the first and second positions) as a function of the learned fuel vapor concentration stemming from the fuel tank. Furthermore, conditions of degraded engine stability may continue to be monitored, such that in the event that the condition of degraded engine stability is inferred, method 300 may proceed with re-routing the fuel vapors to the vent line and then through the entirety of the canister en route to engine intake, as mentioned above.

Under conditions where the fuel tank is depressurized to the second fuel tank pressure threshold and where no condition of degraded engine stability is indicated, method 300 may proceed to 372. At 372, method 300 may include discontinuing the TPC operation by commanding fully closed the CPV, and commanding fully closed the FTIV. By commanding closed the CPV, the canister may be sealed from engine intake, and by commanding closed the FTIV, the fuel tank may be sealed from the canister. It may be understood that commanding closed the FTIV comprises commanding the FTIV to the first position.

Proceeding to 348, method 300 may include updating vehicle operating parameters, which may include updating the current fuel tank pressure at the controller. Method 300 may then end.

From the above discussion regarding conducting the TPC operation, it may be understood that in order to depressurize the fuel tank, the CPV also has to be controlled at least to some extent. For example, if the CPV were maintained closed for a TPC operation, then there would be no vacuum to route the fuel tank vapors to engine intake for combustion, and instead the vapors would be routed to the canister (under conditions where the FTIV is configured in the second position). However, such action of further loading the canister in order to depressurize the fuel tank may be non-desirable for a least a few reasons. First, depending on the current loading state of the canister, further loading of the canister may overwhelm the storage capacity of the canister, which may lead to bleed-through emissions during the TPC operation. Second, even under circumstances where the act of depressurizing the canister does not overwhelm the canister, the fact that the canister becomes further loaded may ultimately lead to bleed emissions, as for hybrid vehicles engine run-time, and hence opportunities for purging, may be limited.

Thus, the strategy discussed above with regard to method 300 includes at least partially purging the canister under conditions where the canister is not yet clean or substantially free of fuel vapors, and then conducting the TPC operation. One reason for doing so is because it may be more efficient to purge fuel vapors from the fuel tank with the FTIV being duty cycled, when the CPV is at a 100% duty cycle, or at least operating at a duty cycle where the CPV spends more time in the open configuration than the closed configuration. Another reason for doing so is to ensure that the canister is not fully loaded with fuel vapors in the event that a condition of degraded engine stability arises during the TPC operation. Specifically, the purpose of re-routing the flow of fuel vapors from the fuel tank to the vent line and then through the entirety of the canister in response to an indication of the condition of degraded engine stability during the TPC operation, is to allow for at least a portion of the fuel vapors to become at least impeded or adsorbed or partially adsorbed to the adsorbent material of the canister prior to the vapors being routed to the engine. While such adsorption may be brief, this action may serve to slow the rate at which the fuel vapors are inducted to the engine, which may in turn serve to mitigate the issue of degraded engine stability. If the fuel vapor canister were not at least partially clean, then the saturated nature of the adsorbent material may allow the re-routed fuel vapors to pass directly through the canister en route to the engine. In such an example, the re-routing of fuel vapors would thus be rendered ineffective in terms of mitigating the issue of degraded engine stability.

There may be other advantages to at least partially cleaning the canister prior to conducting the TPC operation, under conditions where the canister is not already clean when the request to conduct the TPC operation is received at the controller. Specifically, in cleaning the canister first, even under conditions where the purging of the canister has to be aborted for reasons such as reduced engine intake vacuum due to changing vehicle operator engine torque demands, etc., by cleaning the canister to at least some extent the canister may have more room to store any fuel tank vapors which may be routed to the canister when the fuel tank is depressurized to the canister (in a case where the depressurization cannot include directing fuel vapors to the engine). For example, in a situation where TPC is requested, and where the canister is purged to a particular level but then aborted (e.g. CPV commanded closed due to reduced engine intake vacuum), the fuel tank may be depressurized to the canister without overwhelming the canister, since the canister was partially purged and thus there is non-saturated adsorbent material for adsorbing the fuel vapors resulting from fuel tank depressurization. In this way, even under conditions where vehicle operating circumstances change and the TPC operation cannot be conducted in a way where fuel vapors are routed to engine intake for combustion, fuel tank depressurization may still be conducted in a way in which potential for release of undesired evaporative emissions to atmosphere is reduced or avoided.

However, while not explicitly illustrated, there may be other examples where ramping up of the duty cycle of the CPV in order to purge the canister of stored fuel vapors may occur simultaneously with a ramping up of the FTIV in order to conduct a TPC operation. As one example, if the vehicle controller infers that a condition of degraded engine stability is unlikely to occur as a result of the TPC operation in conjunction with the purging operation, then a procedure that involves ramping up of the CPV duty cycle simultaneously with the ramping up of the FTIV duty cycle may be employed. In other words, because a condition of degraded engine stability resulting from the TPC operation is not expected or inferred, then a re-routing of the fuel vapors from the fuel tank to the vent line and then through the entirety of the canister may too be unlikely to be commanded. Thus, whether or not the canister is saturated or nearly so may not be relevant, as fuel vapors stemming from the fuel tank may not be routed to the vent line and then through the entirety of the canister. In such an example, inferring that a condition of degraded engine stability is unlikely to occur may involve retrieving information related to one or more of temperature of fuel in the fuel tank, ambient temperature, reid vapor pressure of fuel in the fuel tank, fuel level in the fuel tank, predicted or inferred absence of fuel slosh events during the TPC operation (e.g. information from GPS revealing the vehicle to be traveling along a straight path for a determined amount of time/distance, or learned information regarding a current route the vehicle is traveling), etc. As a simplified example, if temperature of fuel in the fuel tank is below a predetermined fuel temperature while ambient temperature is below a predetermined ambient temperature and there is an inferred (e.g. via GPS or information pertaining to learned travel routes) absence of upcoming vehicle maneuvers which may result in fuel slosh within the fuel tank, then it may be determined that a condition of degraded engine stability is unlikely to occur in response to the conducting of a TPC operation. In such an example (where the canister is also saturated or nearly so with fuel vapors), a ramping up of the FTIV duty cycle to conduct the TPC operation may occur in conjunction with a ramping up of the CPV duty cycle for additionally purging the canister.

Alternatively, as discussed above with regard to method 300, in response to an indication of a condition of degraded engine stability during a TPC operation, method 300 may proceed to method 400, depicted at FIG. 4. As mentioned, method 400 may be used to, responsive to an indication of a condition of degraded engine stability in response to a TPC operation being conducted, re-route fuel vapors stemming from the fuel tank to the vent line (e.g. 227) and then through an entirety of the fuel vapor canister prior to being directed to engine intake. In this way, mitigating action may be taken to reduce or avoid the condition of degraded engine stability, such that the TPC operation may seamlessly continue without having to be aborted. As method 400 continues from method 300, it may be understood that method 400 is discussed with reference to the systems described herein and shown in FIGS. 1-2, though it will be appreciated that similar methods may be applied to other systems without departing from the scope of this disclosure. Instructions for carrying out method 400 may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-2. The controller may employ actuators such as motor/generator (e.g. 120), CPV (e.g. 261), FTIV (e.g. 252), CVV (e.g. 297), etc.

At 405, method 400 includes controlling the CVV (e.g. 297) at a predetermined duty cycle. Duty cycling the CVV may be understood to increase a vacuum motive force across the canister, which may improve an ability for fuel vapors stemming from the fuel tank and re-routed to the vent line (e.g. 227) to be drawn into the canister en route to engine intake, as compared to if the CVV were not duty cycled. Furthermore, by duty cycling the CVV, fuel tank vapors re-routed to the vent line may be preferentially drawn into the canister without escaping through the vent line to atmosphere.

The predetermined duty cycle of the CVV may comprise a duty cycle that is in some examples a function of a magnitude of the intake manifold vacuum being directed at the fuel tank and canister. For example, the greater the vacuum stemming from the intake manifold, the less time the CVV may be duty cycled to occupy the closed configuration. Alternatively, the lesser the vacuum stemming from the intake manifold, the more time the CVV may be duty cycled to be spent in the closed configuration. The predetermined duty cycle of the CVV may additionally or alternatively be a function of an amount or concentration of fuel vapors stemming from the fuel tank that are resulting (or inferred to result) in the condition of degraded engine stability. For example, the greater the fuel temperature, the higher the ambient temperature, the greater the reid vapor pressure of fuel in the fuel tank, the greater the amount of fuel slosh in the tank, etc., the more time the CVV may be controlled to spend in the closed state. While the discussion with regard to step 405 involves duty cycling the CVV, it may be understood that in other examples where the vehicle does not include a CVV, but rather includes a changeover valve coupled to a pump that is positioned within the vent line, the changeover valve may be duty cycled in similar fashion without departing from the scope of this disclosure.

With the CVV being duty cycled at the predetermined duty cycle, method 400 may proceed to 410. At 410, method 400 may include re-routing the fuel vapors stemming from the fuel tank to, instead of being directed to the load port (e.g. 246) of the canister and then through the purge port (e.g. 247) en route to engine intake, directing the fuel tank vapors to the vent line and vent port (e.g. 249) of the canister. In this way, the fuel vapors stemming from the engine may be directed through an entirety of the canister (e.g. through adsorbent material 286 and 286*a* as opposed to just adsorbent 286*a*), which may serve to slow a rate at which fuel vapors are inducted to the engine, thus mitigating the condition of degraded engine stability. It may be understood that, at 410, switching to re-routing the fuel tank vapors to the vent line may include switching the duty cycling of the FTIV from between the first position and the second position, to instead duty cycling the FTIV between the first position and the third position. It may be further understood that, whatever duty cycle was commanded via the controller just prior to the time of the re-routing, the same duty cycle may be commanded for the FTIV for the re-routing of the fuel vapors stemming from the fuel tank. However, in some examples, the duty cycle may be reduced without departing from the scope of this disclosure, provided the reduction does not involve commanding closed the FTIV such that the depressurization is aborted. In other words, via the methodology of FIG. 4, the fuel tank depressurization may continue without being aborted, even though there is an engine stability issue.

With the fuel vapors stemming from the tank re-routed to the vent line and then through the entirety of the canister en route to engine intake, method 400 may proceed to 415. At 415, method 400 may include continuing to sequentially ramp up the duty cycle of the FTIV between the first and third positions. Output from the exhaust gas oxygen sensor may be relied upon for continuing to learn the concentration of fuel vapors being inducted to the engine, where sequentially ramping up the duty cycle of the FTIV may be a function of the learned concentration of fuel vapors being inducted into the engine, as discussed above.

Proceeding to 420, method 400 may include indicating whether fuel tank pressure is below the second fuel tank pressure threshold, discussed above with regard to step 342 of method 300. If not, then method 400 may return to 415, where the duty cycle of the FTIV may be continued to be sequentially increased over time as a function of the learned concentration of fuel vapors being inducted to the engine. Alternatively, in response to fuel tank pressure being indicated to be below the second fuel tank pressure threshold, method 400 may proceed to 425. At 425, method 400 may include commanding closed the FTIV, or in other words, commanding the FTIV to the first position. At 425, method 400 may further include commanding the CVV fully open, without periodically transitioning to the closed state as was occurring during the re-routing.

Due to the re-routing of fuel vapors to the vent line and through the entirety of the canister, it may be understood that some amount of fuel vapors may become adsorbed to the adsorbent material within the canister. Thus, at 425, method 400 may include maintaining/commanding the CPV fully open, to purge any residual fuel vapors from the canister, prior to ending the routine. Accordingly, with the CVV fully open and the CPV fully open, but with the FTIV commanded to the first position, method 400 may proceed to 430. At 430, method 400 may include indicating whether the canister loading state is below the first threshold canister load. In other words, at 430, method 400 may include indicating whether the canister is substantially cleaned of fuel vapors (e.g. loaded to less than 5% of the capacity of the canister). It may be understood that such an indication may be based off of output from the exhaust gas oxygen sensor, as discussed above. For example, when the exhaust gas sensor is no longer indicating an appreciable amount of fuel vapors being inducted to the engine from the canister, it may be determined that the canister load is below the first threshold canister load. While the exhaust gas oxygen sensor is discussed in terms of providing an indication of canister loading state, in some examples the temperature sensor positioned within the canister may additionally or alternatively be relied upon for the methodology of FIGS. 3-4 for indicating canister loading state.

Responsive to the canister loading state being less than the first threshold canister load, method 400 may proceed to 435. At 435, method 400 may include commanding fully closed the CPV. With the CPV commanded fully closed, it may be understood that the engine is sealed off from the canister. Proceeding to 440, method 400 may include updating vehicle operating parameters. Updating vehicle operating parameters may include updating the current loading state of the canister, and updating the current fuel tank pressure in the fuel tank, as a result of the TPC/purging operation. Method 400 may then end.

Thus, discussed herein a method may comprise reducing a pressure in a fuel tank by routing vapors from the fuel tank through a portion of a fuel vapor canister positioned in an evaporative emissions system of a vehicle and not through an entirety of the fuel vapor canister, and in response to an indication of a condition of degraded stability of an engine, re-routing the vapors from the fuel tank through the entirety of the fuel vapor canister.

In such a method, the portion of the fuel vapor canister may comprise a buffer region of the fuel vapor canister.

In such a method, routing the vapors from the fuel tank through the portion of the fuel vapor canister may further comprise routing the vapors through the portion of the fuel vapor canister and then to the engine. Furthermore, re-routing the vapors from the fuel tank through the entirety of the fuel vapor canister may further comprise routing the vapors to a vent line that couples the fuel vapor canister to atmosphere, and then through the entirety of the fuel vapor canister en route to the engine. In such an example routing the vapors through the portion of the fuel vapor canister may further comprise commanding fully open a canister vent valve positioned in the vent line without duty cycling the canister vent valve. Furthermore, re-routing the vapors through the entirety of the fuel vapor canister may further comprise duty cycling the canister vent valve.

In such a method, routing the vapors through the portion of the fuel vapor canister may further comprise duty cycling a fuel tank isolation valve between a first position and a second position, the fuel tank isolation valve positioned in a conduit coupling the fuel tank to the fuel vapor canister. In such an example, re-routing the vapors through the entirety of the fuel vapor canister may further comprise duty cycling the fuel tank isolation valve between the first position and a third position, where the first position comprises a closed position that seals the fuel tank from the fuel vapor canister and where the second position and the third position comprise open positions of the fuel tank isolation valve.

In such a method, the engine may be operating to combust air and fuel both while the fuel tank vapors are routed through the portion of the fuel vapor canister, and during the re-routing of the fuel vapors through the entirety of the fuel vapor canister.

In such a method, indicating the condition of degraded engine stability may include one or more of an indication of a change in vehicle speed greater than a threshold vehicle speed change, a fuel tank pressure spike, and/or a fuel slosh event as monitored via a fuel level sensor, while the vapors are being routed through the portion of the fuel vapor canister.

In such a method, the method may further comprise controlling a duty cycle of a canister purge valve while routing the vapors from the fuel tank through the portion of the fuel vapor canister and while re-routing the vapors through the entirety of the fuel vapor canister. In such a method, controlling the duty cycle of the canister purge valve may be a function of a loading state of the fuel vapor canister.

In such a method, the method may further comprise discontinuing reducing the pressure in the fuel tank in response to the pressure in the fuel tank decreasing to a predetermined fuel tank pressure threshold.

Another example of a method may comprise reducing a pressure in a fuel tank by duty cycling a fuel tank isolation valve positioned in a conduit coupling the fuel tank to a fuel vapor canister between a first position and a second position. In response to an indication of a condition of degraded stability of an engine, the method may include continuing to reduce the pressure by duty cycling the fuel tank isolation valve between the first position and a third position.

In such a method, the first position may include a closed position that seals the fuel tank from the fuel vapor canister. The second position may include a first open configuration that couples the fuel tank to a buffer region of the fuel vapor canister. The third position may include a second open configuration that couples the fuel tank to a vent line at a position upstream of the canister and downstream of a canister vent valve positioned in the vent line. In such a method, the method may further comprise commanding the canister vent valve fully open without duty cycling the canister vent valve while reducing the pressure in the fuel tank by duty cycling the fuel tank isolation valve between the first position and the second position. The method may further include controlling the canister vent valve at a predetermined duty cycle while reducing the pressure in the fuel tank by duty cycling the fuel tank isolation valve between the first position and a third position.

In such a method, the engine may be operating to combust air and fuel while reducing the pressure in the fuel tank. In such an example, reducing the pressure in the fuel tank may further comprise directing a negative pressure with respect to atmospheric pressure, produced via engine operation, at the fuel vapor canister.

In such a method, the condition of degraded stability of the engine may be indicated based on one or more of a change in vehicle speed greater than a threshold speed change and/or a fuel tank pressure change rate greater than a predetermined fuel tank pressure change rate threshold.

Turning now to FIG. 5, an example timeline 500 for conducting a TPC operation according to the methods of FIGS. 3-4, is illustrated. Timeline 500 includes plot 505, indicating whether a TPC operation is requested (yes or no), over time. Timeline 500 further includes plot 510, indicating canister loading state, over time. Canister loading state may increase (+) or decrease (−) over time. Timeline 500 further includes plot 515, indicating CPV status (open or closed), and plot 520, indicating CVV status (open or closed), over time. Timeline 500 further includes plot 525, indicating a status of the FTIV, over time. The FTIV may be in the first position, in other words, the closed configuration, the second position, or the third position. As discussed above, when the FTIV is in the second position, fuel tank vapors may be routed from the fuel tank through the load port of the canister. Alternatively, when the FTIV is in the third position, fuel tank vapors may be routed from the fuel tank to the vent line stemming from the canister. Timeline 500 further includes plot 530, indicating pressure in the fuel tank, over time. Pressure may increase (+) or may decrease (−), over time. Timeline 500 further includes plot 535, indicating whether a degraded engine stability condition is indicated (yes or no), over time.

At time t0, a TPC operation is not yet requested (plot 505). However, fuel tank pressure is fairly high (plot 530), as pressure has built within the sealed fuel tank, the fuel tank sealed via the FTIV being commanded to the first position (plot 525). While not explicitly illustrated, it may be understood that the vehicle is being propelled via the engine combusting air and fuel at time t0. The CPV is closed (plot 515), and the CVV is open (plot 520). The canister is loaded to an amount greater than the first threshold canister load, represented by dashed line 512, and further greater than the second threshold canister load, represented by dashed line 511. As of time t0, a condition of degraded engine stability is not indicated (plot 535), as neither fuel vapors from the fuel tank nor the canister are being routed to the engine for combustion at time t0.

At time t1, a TPC operation is requested. It may be understood that such a request may be in response to pressure in the fuel tank rising above the first predetermined fuel tank pressure threshold, represented by dashed line 532. While not explicitly illustrated, in response to the request to conduct the TPC operation, it may be inferred as to whether it is likely or expected that a condition of degraded engine stability may result if the fuel tank is depressurized along the first flow path (refer to arrows 293 and 294 of FIG. 2). Specifically, as mentioned above, one or more of fuel tank pressure, temperature of fuel in the fuel tank, ambient temperature, prediction of upcoming fuel slosh events, etc., may be relied upon for inferring whether conditions are such that in response to fuel tank depressurization along the first flow path, a condition of degraded engine stability may occur. While not explicitly illustrated, it may be understood that in this example timeline, the vehicle controller determines that the probability that a condition of degraded engine stability may result in response to fuel tank depressurization along the first flow path is above a predetermined probability threshold. Furthermore, canister loading state is greater than the first threshold canister load, and additionally is greater than the second threshold canister load.

Accordingly, because a condition of degraded engine stability is inferred to potentially occur in response to fuel tank depressurization along the first flow path, and because the canister load is high, at time t2 the CPV is commenced being duty cycled. However, the FTIV is maintained closed (FTIV commanded/maintained in the first position). By maintaining the FTIV closed while the CPV is duty cycled to purge fuel vapors from the canister, vehicle control strategy may free up space in the canister for potentially adsorbing fuel vapors stemming from the fuel tank once the TPC operation commences, in response to a condition of degraded engine stability detected or inferred during the TPC operation.

As discussed above, the CPV is commenced being duty cycled at an initial rate, depicted between time t2 and t3. Output from the exhaust gas oxygen sensor, while not explicitly illustrated, is relied upon for inferring a concentration of fuel vapors being inducted to the engine from the canister, and such data is further relied upon for increasing the duty cycle of the CPV over time while maintaining desired engine air-fuel ratio. Furthermore, inferring the concentration of fuel vapors being desorbed from the canister enables an estimation of canister load, which is determined to decline between time t2 and t3 (plot 510) as a result of the purging of the canister to engine intake.

At time t3, the duty cycle of the CPV is increased such that the CPV spends a greater portion of time in the open state. Such CPV control is maintained between time t3 and t4, and canister load continues to decline. At time t4, the CPV duty cycle is further increased, and as a result, between time t4 and t5, canister loading state drops below the second threshold loading state. As discussed above with regard to method 300, in response to the canister loading state decreasing to below the second threshold loading state, control strategy may commence the TPC operation. Accordingly, at time t5, the CPV is commanded to a 100% duty cycle, and at time t6 the FTIV is commenced being duty cycled between the first position and the second position. The canister is further cleaned between time t6 and t7, as the fuel tank vapors being release from the fuel tank are routed to engine intake along the first flow path, and thus do not further load the canister. As discussed above, routing fuel vapors to engine intake along the first flow path includes routing the vapors through the buffer region of the canister en route to engine intake, and not through the entirety of the canister.

However, just prior to time t7, there is a spike in fuel tank pressure (plot 530). It may be understood that such a spike in fuel tank pressure is in response to a vehicle maneuver that results in significant fuel slosh in the fuel tank, but such an example is meant to be illustrative. Furthermore, while not explicitly illustrated it may be understood that temperature in the fuel tank is high, as is ambient temperature. Thus, with the FTIV being duty cycled between the first position and the second position, and in response to the fuel tank pressure spike, at time t7 a condition of degraded engine stability is indicated via the controller.

Accordingly, to mitigate the effects of such a condition, at time t8 the CVV is commenced being duty cycled to increase a vacuum motive force across the canister (plot 520). Furthermore, the FTIV is commenced being duty cycled between the first position and the third position (plot 525). In duty cycling the FTIV between the first position and the third position, the fuel tank vapors stemming from the fuel tank are re-routed to the vent line (e.g. 227) coupling the canister to atmosphere. While not explicitly illustrated, it may be understood that once in the vent line, fuel tank vapors are routed through the entirety of the canister en route to the engine for combustion. By passing the fuel vapors across the adsorbent material of the entirety of the canister, the rate at which the engine receives the fuel vapors is slowed, thus mitigating the issue of degraded engine stability. Accordingly, at time t9, engine control strategy determines that the condition of degraded engine stability is no longer present (plot 535). However, because degraded engine stability occurred, it may be likely that such a condition may occur again, and thus the FTIV is continued being duty cycled between the first position and the third position. However, in other examples, it may be understood that in response to the degraded engine stability condition no longer being indicated, the FTIV may be switched back to being duty cycled between the first position and the second position. In such an example, in response to another indication of a condition of degraded engine stability, the fuel vapors stemming from the fuel tank may once again be re-routed to the vent line in order to mitigate the degraded engine stability condition.

At time t10, the FTIV duty cycle is increased, based on the learned concentration of fuel vapors being inducted to the engine. Accordingly, between time t10 and t11, fuel tank pressure drops (plot 530). At time t11, the FTIV duty cycle is further increased, and fuel tank pressure decays by time t12 to the second predetermined fuel tank pressure threshold, represented by dashed line 531. Thus, with fuel tank pressure having been relieved to at least the second predetermined fuel tank pressure threshold, TPC is no longer requested (plot 505). Accordingly, the CVV is commanded fully open (plot 520), and the FTIV is commanded to the first position (plot 525). However, the CPV is maintained open to clean any residual fuel vapors added to the canister during the re-routing procedure. With the CPV fully open and the CVV fully open, canister load rapidly decreases to below the first threshold canister load by time t13. Accordingly, the CPV is commanded closed. Between time t13 and t14, current canister loading state and fuel tank pressure readings are updated to reflect the TPC/purging routine, and the engine continues to propel the vehicle according to driver demand.

It is herein recognized that there may be circumstances where the FTIV (e.g. 252) becomes degraded, or in other words, stuck in one of first open position or a second open position. For example, the first open position may refer to the FTIV being stuck in the second position or configuration. The second open position may refer to the FTIV being stuck in the third position or configuration. Accordingly, a diagnostic to determine whether the FTIV is stuck in the first open position or the second open position, is discussed below at FIG. 6.

Turning now to FIG. 6, a high-level example method 600 for diagnosing whether the FTIV is stuck in the first open position or the second open position is depicted. Briefly, the method involves determining a time frame in which fuel tank vapors are routed to the engine in response to fluidically coupling the engine to the fuel vapor storage canister, as monitored via an exhaust gas oxygen sensor, for example a universal exhaust gas oxygen sensor (UEGO) (e.g. 237). Based on the time frame, it may be inferred as to whether the FTIV is stuck in the first open position or the second open position. Method 600 will be described with reference to the systems described herein and shown in FIGS. 1-2, though it will be appreciated that similar methods may be applied to other systems without departing from the scope of this disclosure. Instructions for carrying out method 600 may be executed by a controller, such as controller 212 of FIG. 2, based on instructions stored in non-transitory memory, and in conjunction with signals received from sensors of the engine system, such as temperature sensors, pressure sensors, and/or other sensors described in FIGS. 1-2. The controller may employ actuators CPV (e.g. 261), FTIV (e.g. 252), CVV (e.g. 297), etc., according to the methods described herein.

Method 600 begins at 605, and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 610, method 600 includes indicating whether conditions are indicated to be met for conducting the FTIV diagnostic. Conditions being met may include an indication that vacuum and/or positive pressure greater than a vacuum threshold and/or a positive pressure threshold, respectively, has failed to develop in the fuel tank with the FTIV closed (e.g. configured in the first position) under conditions where positive pressure or negative pressure greater than the positive pressure threshold or vacuum threshold, respectively, is expected to develop. For example, if the positive pressure threshold is not reached or exceeded, nor is the vacuum threshold reached or exceeded, over a predetermined number of diurnal cycles (e.g. 1 diurnal cycle, 2 diurnal cycles, 3 diurnal cycles, 4 diurnal cycles, 5 diurnal cycles, etc.), then it may be indicated that conditions are met for conducting the FTIV diagnostic. In other words, a failure to develop pressure and/or vacuum in a sealed fuel system may be an indication that the FTIV is stuck in either the first open position (e.g. FTIV configured in the second position) or the second open position (e.g. FTIV configured in the third position). It may be understood that a source of undesired evaporative emissions stemming from the fuel system may also result in failure to develop pressure and/or vacuum in a sealed fuel tank. Thus, conditions being met at 610 may additionally include an indication that there are no sources of undesired evaporative emissions stemming from the fuel system. Conditions being met at 610 may additionally include an indication that the evaporative emissions system is free from undesired evaporative emissions.

Conditions being met at 610 may in include an indication that the canister is substantially cleaned of fuel vapors (e.g. loaded to less than 5% of the capacity of the canister). Furthermore, conditions being met at 610 may include an engine on condition where the fuel pump that provides fuel to the engine is activated.

In response to conditions not being met for conducting the diagnostic, method 600 may proceed to 615. At 615, current vehicle operating conditions may be maintained. For example, current status of the FTIV, CPV, CVV, etc., may be maintained. Method 600 may then end.

Returning to 610, responsive to conditions being indicated to be met for conducting the FTIV diagnostic, method 600 may proceed to 620. At 620, method 600 may include commanding closed the CVV. While not explicitly illustrated, at 620, method 600 may include commanding closed or maintaining closed the CPV. In this way, it may be understood that the fuel system and evaporative emissions system may be sealed from atmosphere and from engine intake.

Continuing to 625, method 600 may include indicating whether pressure in the fuel system, monitored for example via the FTPT (e.g. 291) is greater than a predetermined positive pressure threshold. In other words, with the engine in operation and thus the fuel pump operating to provide fuel to the engine (or in a case where the fuel pump is commanded on in the absence of engine operation), the generation of fuel vapors and thus positive pressure in the fuel system may be expected. Accordingly, in response to pressure in the sealed fuel system and evaporative emissions system reaching or exceeding the predetermined positive pressure threshold, method 600 may proceed to 630. At 630, method 600 may include commanding open the CPV while maintaining the CVV closed, in order to purge fuel vapors to the engine.

Proceeding to 635, method 600 may include monitoring output from the exhaust gas sensor (e.g. 237), which may comprise a UEGO. Continuing at 640, method 600 may include indicating whether the UEGO output indicates a rich air-fuel (A/F) ratio within a first predetermined duration. The first predetermined duration may comprise 2-4 seconds, for example. In other words, at 640, method 600 may indicate whether the UEGO switches rich within 2-4 seconds of commanding open the CPV. Switching rich may comprise a predetermined A/F ratio being attained, indicative of a rich air/fuel ratio as compared to stoichiometric A/F ratio.

In response to the exhaust gas sensor indicating the rich A/F ratio within the first predetermined duration, method 600 may proceed to 645. At 645, method 600 may include indicating that the FTIV is stuck in the first open position, or in other words, the FTIV is stuck in the second position. Said another way, because the exhaust gas sensor switched rich within the first predetermined time frame, it may be inferred that fuel vapors were routed along the first flow path, through a portion (e.g. buffer region) of the fuel vapor canister en route to the engine, and not through the second flow path, or in other words, through the entirety of the canister. Proceeding to 650, method 600 may include storing the result at the controller. Continuing to 655, method 600 may include updating vehicle operating parameters. Updating vehicle operating parameters may include setting a diagnostic trouble code (DTC), and may further include illuminating a malfunction indicator light (MIL) at the vehicle dash, to alert the vehicle operator of a request to service the vehicle. Furthermore, because the FTIV is indicated to be stuck in the second position, updating vehicle operating parameters may include taking mitigating action. Such mitigating action is discussed below with regard to the methodology depicted at FIGS. 11-12. Accordingly, updating vehicle operating parameters may include taking mitigating action by relying on the method of FIGS. 11-12. Method 600 may then end.

Returning to 640, in response to the exhaust gas sensor not indicating a rich A/F ratio within the first predetermined duration, method 600 may proceed to 660. At 660, method 600 may include commanding open the CVV while maintaining the CPV open. In this way, engine operation may draw a vacuum on the canister, and with the CVV open, fresh air may be drawn across the canister to desorb fuel vapors to the engine. Similar to step 635, output of the exhaust gas sensor (e.g. UEGO) may be monitored. Proceeding to 670, method 600 may include indicating whether the exhaust gas sensor switches rich within a second predetermined duration, the second predetermined duration greater than the first predetermined duration. In one example, the second predetermined duration may comprise 4.1 seconds to 10 seconds.

If it is indicated that the exhaust gas sensor switches rich within the second predetermined duration, method 600 may proceed to 675. At 675, method 600 may include indicating that the FTIV is stuck in the second open position, or in other words, stuck in the third position. Said another way, because the exhaust gas sensor failed to switch rich within the first predetermined duration, but switched rich within the second predetermined duration, it may be inferred that the fuel vapors were routed through an entirety of the canister via the second flow path, thus leading to the delay in the exhaust gas sensor switching rich.

Proceeding to 680, method 600 includes storing the result at the controller. Continuing to 685, method 600 may include updating vehicle operating parameters. Similar to that discussed above at step 655, updating vehicle operating parameters may include setting a diagnostic trouble code (DTC), and may further include illuminating a MIL at the dash. Mitigating action may additionally be taken, as elaborated below at FIGS. 11-12. Method 600 may then end.

Returning to 670, in response to the exhaust gas sensor not switching rich within the second predetermined duration, method 600 may proceed to 690. At 690, method 600 may include scheduling follow-up tests. As one example, follow-up tests may include diagnostics to determine an extent to which the canister filter (e.g. 292) is clogged, as sufficient clogging of the filter may lead to longer than anticipated or expected fuel vapor transit times from the fuel tank to the engine. Accordingly, such a test may be scheduled to be conducted responsive to conditions being met for doing so, as will be discussed in further detail below with regard to FIG. 8.

Proceeding to 695, method 600 may include updating vehicle operating parameters. Updating vehicle operating parameters may include discontinuing purging of the canister where possible. For example a purge schedule may be updated to avoid purging of the canister. Vehicle operating parameters may be updated to operate in electric-only mode as frequently as possible, so as to minimize operation of the fuel pump and thus minimize fuel vapor generation which may load the canister. Method 600 may then end.

Turning now to FIG. 7, an example timeline 700 is shown, depicting the conducting of the FTIV diagnostic of FIG. 6. Timeline 700 includes plot 705, indicating whether conditions are met (yes or no) for conducting the diagnostic. Timeline 700 further includes plot 710, indicating engine status (on or off), over time. When the engine is on, it may be understood that the engine is combusting air and fuel. Timeline 700 further includes plot 715, indicating pressure as monitored via the FTPT (e.g. 291), over time. In this example timeline, pressure may be at atmospheric pressure, or greater than (+) atmospheric pressure. Timeline 700 further includes plot 720, indicating output from the exhaust gas sensor (e.g. UEGO), over time. Output may include an indication of a stoichiometric A/F ratio, or a rich or a lean A/F ratio with respect to stoichiometric A/F ratio. Timeline 700 further includes plot 725, indicating a status of the CPV, and plot 730, indicating a status of the CVV, over time. For each of plots 725 and 730, the respective valves may be either fully open or fully closed.

Timeline 700 further includes plot 735, indicating the commanded FTIV position. The FTIV may be commanded to the first position, the second position, or the third position. Timeline 700 further includes plot 740, indicating canister load, over time. The canister may be substantially clean, or may be loaded (+) to varying extents. Timeline 700 further includes plot 745, indicating whether the FTIV is stuck in the second position (yes or no), and plot 750, indicating whether the FTIV is stuck in the third position (yes or no), over time. For plots 745 and 750, under circumstances where it is unknown as to whether the FTIV is stuck in the second or third position, plots 745 and 750 are denoted as non-applicable (n/a).

At time t0 the engine is on (plot 710), and the CPV (plot 725) and CVV (plot 730) are open. Thus, it may be understood that a canister purging operation is currently taking place. Accordingly, conditions are not indicated for conducting the FTIV diagnostic (plot 705). Pressure as monitored by the FTIV is near atmospheric pressure, and A/F ratio as monitored by the exhaust gas sensor is stoichiometric (plot 720). The FTIV is commanded to the first position (plot 735), and the canister is not yet clean (plot 740). As of time t0, it has not yet been determined as to whether the FTIV is stuck in the second position (plot 745) or the third position (plot 750).

Between time t0 and t1, the canister becomes cleaned of fuel vapors due to the purging operation. With the canister clean, at time t1, conditions are indicated to be met for conducting the FTIV diagnostic, as discussed above with regard to step 610 of method 600. With conditions being met at time t1, the CPV is commanded closed. At time t2, the CVV is commanded closed.

Between time t2 and t3, pressure as monitored by the FTPT rises, and at time t3, the pressure reaches the positive pressure threshold represented by line 716. Accordingly, with the positive pressure threshold having been reached, the CPV is commanded open. Between time t3 and t4, with the CPV open and the CVV closed, the exhaust gas sensor output does not switch rich (see plot 720). In other words, at time t4, it is indicated that the A/F ratio has not switched rich during the first predetermined duration, the first predetermined duration represented by line 721. Because a rich A/F ratio was not indicated at time t4, it is inferred that the FTIV is not stuck in the first open position, or in other words, the second position (plot 745). Furthermore, canister loading state increased slightly between time t3 and t4. It may be understood that the canister loading state increasing during the first predetermined duration is indicative of the FTIV being stuck in the third position. Thus, in some examples, a canister temperature sensor (e.g. 232) may be used to monitor canister temperature, and a canister temperature increase during the first predetermined duration may be relied upon to infer whether the FTIV is stuck in the third position.

Because the exhaust gas sensor output did not switch rich during the first predetermined duration, at time t4, the CVV is commanded open. Between time t4 and t5, with the CPV and CVV open, the canister is purged of fuel vapors (plot 740). Furthermore, the exhaust gas sensor switches rich between time t4 and t5, within the second predetermined duration represented by line 722. Accordingly, at time t5, it is indicated that the FTIV is stuck in the third configuration (plot 750), or in other words, the second open position.

Upon determining that the FTIV is stuck in the third position, conditions are no longer indicated to be met for conducting the diagnostic (plot 705), and accordingly, the CPV is commanded closed. After time t5, engine operation continues.

Thus, based on the timeline of FIG. 7, it may be understood that under circumstances where the FTIV is stuck in the second position (even when commanded to the first position), the amount of time between commanding open the CPV and the exhaust gas sensor switching rich is shorter than when the FTIV is stuck in the third position. This is because the fuel vapors travel through a portion (e.g. buffer region) of the canister and then to the engine when the FTIV is stuck in the second position, whereas the fuel vapors travel through an entirety of the canister when the FTIV is stuck in the third position. Furthermore, under conditions where the FTIV is stuck in the third position, with the CPV commanded open but the CVV commanded closed, fuel vapors may be pulled into the canister where they may be adsorbed therein, due to a lack of fresh air flow across the canister. This adsorption contributes to the delay, and fuel vapors are then desorbed from the canister once the CVV is commanded open and fresh air flows across the canister.

Thus, discussed herein a method may comprise diagnosing whether a fuel tank isolation valve positioned in a load conduit between a fuel system and a fuel vapor storage canister is stuck in a first open position or a second open position based on a time duration between commanding open a canister purge valve to direct fuel vapors to an engine and an exhaust gas sensor indicating a rich air-fuel ratio as compared to a stoichiometric air-fuel ratio.

In such a method, the fuel tank isolation valve may comprise a three-way isolation valve configurable in a first position, a second position and a third position, where the first position comprises a closed position, the second position comprises the first open position, and the third position comprises the second open position.

In such a method, the method may further comprise sealing the fuel system and fuel vapor storage canister from the engine and from atmosphere and monitoring a pressure in the fuel system. In such an example, commanding open the canister purge valve may be in response to the pressure in the fuel system being greater than a predetermined positive pressure threshold with respect to atmospheric pressure.

In such a method, the fuel tank isolation valve being stuck in the first open position may direct fuel vapors from the fuel system through a portion of the fuel vapor storage canister in response to the canister purge valve being commanded open. The fuel tank isolation valve being stuck in the second open position may direct fuel vapors from the fuel system through an entirety of the fuel vapor storage canister in response to the canister purge valve being commanded open.

In such a method, the method may further comprise indicating the fuel tank isolation valve is stuck in the first open position in response to the time duration comprising a first time duration and indicating the fuel tank isolation valve is stuck in the second open position in response to the time duration comprising a second time duration. The first time duration may be of a shorter duration than the second time duration. Commanding open the canister purge valve may further comprise maintaining a canister vent valve closed, the canister vent valve positioned in a vent line that fluidically couples the fuel vapor storage canister to atmosphere, and in response to the exhaust gas sensor not indicating the rich air-fuel ratio during the first time duration, commanding open the canister vent valve and maintaining open the canister purge valve. In such a method, the method may further comprise adjusting the first time duration and the second time duration as a function of an extent to which a canister filter is inferred to be clogged.

In such a method, diagnosing whether the fuel tank isolation valve is stuck in the first open position or the second open position is in response to an expected positive pressure or an expected negative pressure with respect to atmosphere failing to develop in the fuel system with the fuel tank isolation valve commanded closed.

Another example of a method for a vehicle as discussed herein may comprise diagnosing whether a fuel tank isolation valve that regulates a flow of fuel vapors from a fuel system to an evaporative emissions system that includes a fuel vapor storage canister is stuck in a first open position or a second open position based on a time duration for an exhaust gas sensor to indicate a rich air-fuel ratio in response to purging the fuel vapors to an engine. The method may further include taking mitigating action in response the fuel tank isolation valve being stuck in the first open position or the second open position.

In such a method, the fuel tank isolation valve being stuck in the first open position may direct fuel vapors through a buffer region of the fuel vapor storage canister and not through an entirety of the fuel vapor storage canister in response to the purging. The fuel tank isolation valve being stuck in the second open position may direct fuel vapors through an entirety of the fuel vapor storage canister including the buffer region in response to the purging.

In such a method, the method may further comprise initiating the purging in response to a pressure in the fuel system greater than a predetermined positive pressure threshold while the fuel system and evaporative emissions system are sealed from atmosphere and the engine.

In such a method, the time duration may comprise one of a first duration and a second duration, the second duration being greater than the first duration. Diagnosing whether the fuel tank isolation valve is stuck in the first open position or the second open position may comprise indicating the fuel tank isolation valve is stuck in the first open position in response to the exhaust gas sensor indicating the rich air-fuel ratio during the first duration, and indicating the fuel tank isolation valve is stuck in the second open position in response to the exhaust gas sensor indicating the rich air-fuel ratio during the second duration.

In such a method, taking mitigating action may comprise monitoring a loading state of the fuel vapor storage canister while the vehicle is in operation, and purging the fuel vapor storage canister in response to the loading state being indicated to be greater than a threshold loading state. The fuel vapor storage canister may be coupled to atmosphere while monitoring the loading state in response to the fuel tank isolation valve being indicated to be stuck in the first open position. The fuel vapor storage canister may be sealed from atmosphere while monitoring the loading state in response to the fuel tank isolation valve being indicated to be stuck in the second open position.

In such a method, taking mitigating action may further comprise in response to the fuel tank isolation valve being indicated to be stuck in the second open position, and further in response to an indication of a request for refueling or a vehicle-off condition, sealing the fuel system and the evaporative emissions system from atmosphere and fluidically coupling the fuel system and the evaporative emissions system to the engine.

It is herein recognized that the fuel vapor transit times (e.g. within the first predetermined duration or the second predetermined duration) may be variable depending on an extent to which the canister filter is clogged. Accordingly, if the same first and second predetermined durations were relied upon under conditions where the canister filter is clogged to varying extents, robustness and accuracy of the FTIV diagnostic discussed at FIG. 6 may be compromised. Accordingly, it is herein recognized that it may be desirable to regularly determine the extent to which the canister filter is clogged, such that the first predetermined duration and second predetermined duration may be updated correspondingly. Such a canister filter diagnostic is depicted at FIG. 8.

Accordingly, turning to FIG. 8, a high-level example method 800 for conducting a canister filter diagnostic is shown. Briefly, the method involves determining a degree to which the canister filter is clogged following a refueling event that loads the canister with fuel vapors. Specifically, with the canister loaded, a canister purging operation may be initiated, and depending on the amount of time it takes for the exhaust gas sensor to switch rich, an extent of canister filter clogging may be indicated. The extent of clogging may further impact the magnitude of the exhaust gas sensor output, and accordingly, the magnitude of the output of the exhaust gas sensor may additionally be accounted for in determining the extent of clogging of the canister. Method 800 will be described with reference to the systems described herein and shown in FIGS. 1-2, though it will be appreciated that similar methods may be applied to other systems without departing from the scope of this disclosure. Instructions for carrying out method 800 may be executed by a controller, such as controller 212 of FIG. 2, based on instructions stored in non-transitory memory, and in conjunction with signals received from sensors of the engine system, such as temperature sensors, pressure sensors, and/or other sensors described in FIGS. 1-2. The controller may employ actuators CPV (e.g. 261), FTIV (e.g. 252), CVV (e.g. 297), etc., according to the methods described herein.

Method 800 begins at 805, and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 810, method 800 includes inferring whether a refueling event is in progress. For example, a refueling event may be inferred based on an indication that refueling has been requested by the vehicle operator, based on an increasing fuel level in the fuel tank, etc. If, at 810, a refueling event is not indicated to be in progress, method 800 may proceed to 815. At 815, method 800 may include maintaining current vehicle operating conditions. For example, if the engine is operating to propel the vehicle, such operation may continue. Method 800 may then end.

Returning to 810, responsive to an indication that a refueling event is in progress, method 800 may proceed to 820. At 820, method 800 may include monitoring fuel level and/or fuel system pressure during the refueling event. Fuel level may be monitored via the fuel level indicator (e.g. 234), and fuel system pressure may be monitored via the FTPT (e.g. 291).

Proceeding to 825, method 800 may include indicating whether the refueling event is complete. Such an indication may include fuel level plateauing for greater than a threshold duration of time, an indication that the fuel nozzle has been removed, an indication that the refueling lock has been locked, etc.

In response to refueling being indicated to be completed, method 800 may proceed to 830. At 830, method 800 may include indicating whether one or more premature shutoff(s) were indicated during the refueling event. Such an indication may be based on the monitored fuel level and/or fuel system pressure. For example, fuel level plateau(s) followed by fuel level increasing again may be indicative of premature shutoff event(s) of the dispensing nozzle. Additionally or alternatively, fuel system pressure spike(s) followed by rapid pressure decrease(s) may be indicative of premature shutoff event(s).

Responsive to an indication of one or more premature shutoff event(s), method 800 may proceed to 835. At 835, method 800 may include indicating degradation. The premature shutoff events may be due to the canister itself being clogged, a restriction in the vent line stemming from the canister, a degraded CVV, etc. However, it may be understood that premature shutoff event(s) may not be attributable to an extent to which the canister filter is clogged, as vapors would not be expected to be routed through the canister filter during refueling, the canister filter being positioned adjacent to the purge port (e.g. 247) of the canister.

Proceeding to 840, method 800 may include storing the result at the controller. At 845, method 800 may include updating vehicle operating parameters, which may include setting a DTC and illuminating a MIL at the dash, to alert the vehicle operator of a request to service the vehicle. Updating vehicle operating parameters may further include preventing the FTIV diagnostic of FIG. 6 from being conducted, due to the degradation being likely to interfere with the outcome of the FTIV diagnostic of FIG. 6.

Returning to 830, in response to an indication of an absence of premature shutoff(s) being indicated during the refueling event, method 800 may proceed to 850. At 850, method 800 may include indicating whether conditions are met for conducting the canister filter diagnostic. Conditions being met at 850 may include an indication of a canister load greater than a predetermined threshold canister load (e.g. 40%, 50%, 60%, 70%, 80%, 90%, etc.). Conditions being met may additionally or alternatively include an indication that there is an absence of indicated engine degradation, and that the engine is operating at stoichiometric A/F ratio. In other words, that the engine has been activated after the refueling event, and is not degraded and is operating at stoichiometric A/F ratio. Conditions being indicated to be met may additionally or alternatively include an indication that engine manifold vacuum is greater than a threshold manifold vacuum, the threshold manifold vacuum comprising a vacuum level great enough to purge fuel vapors from the canister to engine intake for conducting the diagnostic.

If, at 850 conditions are not indicated to be met, method 800 may proceed to 855. At 855, method 800 may include maintaining current vehicle operating conditions. In a situation where conditions are not met simply due to engine manifold vacuum not being greater than the threshold manifold vacuum, for example, method 800 may continue to assess whether conditions are met for conducting the diagnostic. However, while not explicitly illustrated, it may be understood that responsive to conditions not being met due to engine degradation, for example, method 800 may end.

Returning to 850, responsive to conditions being indicated to be met for conducting the canister filter diagnostic, method 800 may proceed to 860. At 860, method 800 may include commanding open the CVV and the CPV. If the CVV is already open, then the CVV may be maintained open at 860. Continuing to 865, method 800 may include monitoring output of the exhaust gas sensor (e.g. UEGO) (e.g. 237). It may be understood that monitoring the output of the exhaust gas sensor may be conducted in similar fashion as that discussed above with regard to FIG. 6.

Proceeding to 870, method 800 may include determining a time duration between the opening of the CPV, and the exhaust gas sensor switching rich (e.g. switching from indicating stoichiometric A/F ratio to indicating a rich A/F ratio). Switching rich may be indicated in response to a predetermined exhaust gas output being indicated, the predetermined output indicative of a rich A/F ratio. It may be understood that the time duration may reflect the extent to which the canister filter is clogged. For example, the longer the time duration, the greater the extent to which the canister filter may be inferred to be clogged. It may be further understood that the magnitude of the rich output may be variable depending on the extent of canister filter clogging. Thus, in some examples, magnitude of the output of the exhaust gas sensor may be determined, and may be taken into account when determining the extent of canister filter clogging. While not explicitly illustrated, it may be understood that upon determining the time duration at 870, the result may be stored at the controller. The magnitude of exhaust gas sensor output may too be stored at the controller. It may be further understood that the time duration may be compared to a baseline time duration and a baseline exhaust gas sensor output, the baseline time duration and magnitude of exhaust gas sensor output obtained with a new filter, for inferring the extent of canister filter clogging. Such comparing of the baseline time duration, and in some examples magnitude of the exhaust gas sensor output to the newly obtained time duration, and in some examples magnitude of exhaust gas sensor output, may be carried out by the controller that stores instructions for doing so, in order to output the extent to which the canister filter is clogged based on the comparing. For example, the controller may store a model which receives inputs including but not limited to the baseline time duration and/or baseline exhaust gas sensor output magnitude, and the test time duration and/or test magnitude of exhaust gas sensor output. The model may output an extent of canister filter clogging based on the inputs, and in some examples, the model may further output a predicted remaining lifetime of the canister filter.

Proceeding to 875, method 800 may include indicating whether canister load is less than a threshold. In other words, at 875, method 800 may include indicating whether the canister is substantially free of fuel vapors. If not, then the purging operation may continue. Alternatively, responsive to the canister being indicated to be substantially clean, method 800 may proceed to 880. At 880, method 800 may include updating vehicle operating parameters, where the CPV may be commanded closed. In one example, updating vehicle operating parameters may include retrieving the results of method 800, and converting the time duration and/or magnitude of exhaust gas sensor output to a percent or extent of canister filter clogging, as discussed above. Updating vehicle operating parameters at 880 may in some examples include adjusting or compensating the first predetermined duration and the second predetermined duration that is relied upon for the FTIV diagnostic of FIG. 6.

For example, turning to FIG. 9, an example lookup table 900 is shown. Lookup table 900 depicts the first predetermined duration and the second predetermined duration as a function of the extent to which the canister filter is clogged. Under conditions where it is indicated that the canister filter is not clogged (e.g. 0% clogged), the first predetermined duration may comprise 2-4 seconds, and the second predetermined duration may comprise 4.1-10 seconds, as discussed above. However, under circumstances where the canister filter is, for example, 50% clogged, then the first duration may comprise 3-6 seconds, whereas the second duration may comprise 6.1-15 seconds. In this way, the FTIV diagnostic of FIG. 6 may be conducted and return robust results pertaining to whether the FTIV is stuck in the first open position or the second open position, even under circumstances where the canister filter is clogged to varying extents. While the lookup table of FIG. 9 depicts clogging of 25%, 50% and 75%, it may be understood that such clogging percentages are for illustrative purposes only, and there may be any number of different clogging percentages without departing from the scope of this disclosure.

Thus, returning to 880, updating vehicle operating parameters may include setting the first predetermined duration and the second predetermined duration for the FTIV diagnostic of FIG. 6 to be set to the values retrieved from the lookup table of FIG. 9, depending on how clogged the canister is inferred to be. Updating vehicle operating parameters may further include adjusting a threshold manifold vacuum for purging the canister (where the purging does not include purging for conducting the canister filter diagnostic), as a function of the extent to which the canister filter is clogged. For example, a greater (e.g. more negative) intake manifold vacuum may be set as an entry condition for initiating a canister purging event, as a function of the extent to which the canister filter is determined to be clogged. Furthermore, for purging events, it may be understood that initiation of purging may include commanding the CPV to be duty cycled at a predetermined initial duty cycle, and then the duty cycle may be ramped up over time as a function of a learned amount of fuel vapors being inducted to the engine. Under circumstances where the canister filter is clogged, the initial duty cycle may be set to be greater, as a function of the extent of canister clogging. As a non-limiting example, an initial duty cycle of the CPV may comprise 30% when the canister filter is not clogged, but may comprise 50% when the canister filter is 25% clogged. Updating vehicle operating parameters may further include setting a DTC and illuminating a MIL at the dash in response to canister filter clogging being inferred to be greater than a threshold level of clogging (e.g. 25%, 35%, 50% clogged).

It may be understood that determining the extent of canister filter clogging as per the method of FIG. 8 may be relied upon even in situations where the FTIV does not comprise a three-way valve and/or independent of an FTIV diagnostic such as that depicted at FIG. 6. In other words, it may be desirable to periodically conduct the canister filter diagnostic routine of FIG. 8, in order to estimate or infer remaining canister filter lifetime. For example, based on the canister filter diagnostic results of FIG. 8, the controller may further take into account variables including but not limited to miles driven, number of refueling events and/or amount of fuel added to the fuel tank, number of purging events, hours of engine operation, etc., since a new canister filter was installed, and may output an estimated time remaining until it may be desirable to replace the canister filter. In one example, the variables described above may be input into a model which then outputs the remaining canister filter lifetime. An indication of canister filter lifetime may be communicated to the vehicle operator via a text-based message at the dash, an audible message, a text-based message sent to a phone of the vehicle operator, etc. Estimated remaining canister lifetime may further be stored at the controller, which may enable a technician to readily assess whether the canister filter is in need of replacing.

It may be understood that because the canister filter diagnostic of FIG. 8 is conducted based on a time duration and/or magnitude of exhaust gas sensor output between commanding open the CPV and the exhaust gas sensor switching rich, such methodology does not rely on an FTPT sensor or other sensor positioned in the fuel system and/or evaporative emissions system. Accordingly, such methodology may be applicable for vehicles that do not include an FTPT or other similar sensor.

Turning now to FIG. 10, an example timeline 1000 is depicted, illustrating how the canister filter diagnostic of FIG. 8 may be conducted. Timeline 1000 depicts plot 1005, indicating whether a refueling event is in progress (yes) or not (no), over time. Timeline 1000 further includes plot 1010, indicating an engine status (on or off), over time. It may be understood that when the engine is on, the engine is combusting air and fuel. Timeline 1000 further includes plot 1015, indicating whether one or more premature shutoff(s) of a refueling dispenser are indicated during refueling (yes, no, or non-applicable), over time. Timeline 1000 further includes plot 1020, indicating a fuel level in the fuel tank, monitored via, for example the fuel level indicator (FLI) (e.g. 234), over time. Timeline 1000 further includes plot 1025, indicating a status of the CPV, and plot 1030, indicating a status of the CVV, over time. For plots 1025 and 1030, the respective valves may be either fully open or fully closed. Timeline 1000 further includes plot 1035, indicating an output of the exhaust gas sensor (e.g. UEGO), over time. Output may indicate a stoichiometric A/F ratio, or may indicate a rich or lean ratio as compared to stoichiometric A/F ratio. Timeline 1000 further includes plot 1040, indicating whether conditions are indicated to be met for conducting the canister filter diagnostic (yes or no), over time. Timeline 1000 further includes plot 1045, indicating an extent to which the canister filter is clogged, over time. In this illustrative example timeline, the canister filter may be not clogged (0%), or clogged to 25% or 50%. However, it may be understood that the methodology of FIG. 8 may enable determination of range of clogging percentages spanning 0%-100%.

At time t0, the vehicle is being refueled (plot 1005), and accordingly, the engine is off (plot 1010). No premature shutoffs have been indicated as of time t0 (plot 1015), and fuel level in the tank is a function of the refueling event (plot 1020). The CPV is closed and the CVV is open (see plots 1025 and 1030, respectively). As the vehicle is in the act of being refueled, conditions are not indicated to be met for conducting the canister filter diagnostic (plot 1040). As of time t0, the canister has not been indicated to be clogged to any extent (plot 1045).

Between time t0 and t1, fuel level in the tank continues to rise, and at time t1 fuel level plateaus. At time t2, it is indicated that the refueling event is no longer requested. No premature shutoffs of the refueling dispenser were indicated throughout the refueling event, and this result is stored at the controller.

At time t3, the engine is turned on, and between time t3 and t4 after a brief rich A/F ratio at the engine startup event, the engine operates at a stoichiometric A/F ratio. At time t4, conditions are indicated to be met for conducting the canister filter diagnostic (refer to step 850 of method 800). Accordingly, the CPV is commanded open and the CVV is maintained open. Between time t4 and t5, exhaust gas sensor (e.g. UEGO) output is monitored to assess when the sensor switches rich. Line 1036 represents a first time frame where, if the exhaust gas sensor output switches rich it may be inferred that the canister filter is 0% clogged. Accordingly, it may be understood that the first time frame comprises the baseline time duration. Line 1037 represents a second time frame where, if the exhaust gas sensor output switches rich it may be inferred that the canister filter is 25% clogged. Line 1038 represents a third time frame where, if the exhaust gas sensor output switches rich it may be inferred that the canister filter is 50% clogged. In this example timeline, between time t4 and t5 the exhaust gas sensor output switches rich within the third time frame, and accordingly, at time t5 it is indicated that the canister filter is 50% clogged.

Turning now to FIG. 11, as discussed above with regard to FIG. 6, in response to an indication that the three-way FTIV is stuck in one of the first open position or the second open position, appropriate mitigating action may be taken. Accordingly, FIG. 11 depicts example method 1100, for use in taking mitigating action in response to an indication that the FTIV is stuck in one of the second position (e.g. first open position) or the third position (e.g. second open position). Method 1100 will be described with reference to the systems described herein and shown in FIGS. 1-2, though it will be appreciated that similar methods may be applied to other systems without departing from the scope of this disclosure. Instructions for carrying out method 1100 may be executed by a controller, such as controller 212 of FIG. 2, based on instructions stored in non-transitory memory, and in conjunction with signals received from sensors of the engine system, such as temperature sensors, pressure sensors, and/or other sensors described in FIGS. 1-2. The controller may employ actuators CPV (e.g. 261), FTIV (e.g. 252), CVV (e.g. 297), etc., according to the methods described herein.

Method 1100 begins at 1105, and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing to 1110, method 1100 includes indicating whether the FTIV is stuck in the second position (e.g. first open position). If not, method 1100 may proceed to 1115, where it may be determined whether the FTIV is stuck in the third position. If the FTIV is not indicated to be stuck in either the second position or the third position, method 1100 may proceed to 1120, where current operating parameters may be maintained. Method 1100 may then end. Alternatively, responsive to the FTIV being indicated to be stuck in the third position, method 1100 may proceed to FIG. 12, discussed in further detail below.

Returning to 1110, responsive to the FTIV being indicated to be stuck in the second position, method 1100 may proceed to 1125. At 1125, method 1100 may include indicating whether the vehicle is in operation. If not, method 1100 may proceed to 1130, where current operating parameters may be maintained. For example, the vehicle may be maintained off. Method 1100 may then end.

Returning to 1125, in response to the vehicle being in operation, method 1100 may proceed to 1135. At 1135, method 1100 may include monitoring the loading state of the canister. Specifically, it may be understood that because the FTIV is stuck in the second position, fuel pump operation, driving conditions (e.g. fuel slosh events), ambient temperature changes, engine heat rejection, etc., may result in fuel vapor generation, and the fuel vapors may travel unimpeded through the open FTIV to the canister. Thus, the canister may be continually loaded with fuel vapors, as compared to a situation where the fuel tank is sealed by the FTIV being closed (e.g. FTIV in the first position). If mitigating action were not taken, such loading of the canister may lead to breakthrough of fuel vapors from the canister upon the canister becoming saturated, which may undesirably increase release of evaporative emissions to atmosphere. Monitoring canister loading state at 1135 may include inferring canister loading state based on one or more of temperature changes within the canister as monitored via the canister temperature sensor (e.g. 232) and fuel vaporization rate. Fuel vaporization rate may be inferred as a function of fuel RVP, fuel level, fuel system pressure, ambient temperature, estimates of heat rejection from the engine, etc. In some examples, an estimation of fuel vaporization rate may be inferred by commanding closed the CVV and monitoring pressure in the fuel system for a predetermined duration before commanding open the CVV.

Proceeding to 1140, method 1100 may include indicating whether purging conditions are met. Purging conditions being met may include a canister loading state greater than a threshold canister loading state. For example, the threshold canister loading state may comprise 80% full, 75% full, etc. However, in other examples, the threshold canister loading state may be lower, such as 40% full, 50% full, etc. Purging conditions being met at 1140 may further include the engine being in operation combusting air and fuel, an intake manifold vacuum greater than a threshold intake manifold vacuum, etc. In an example where the vehicle is in operation but where the engine is not on (e.g. electric-only mode), in response to purging conditions being met the engine may be activated in order to clean the canister of fuel vapors.

In response to purging conditions being met at 1140, method 1100 may proceed to 1145. At 1145, method 1100 may include purging fuel vapors stored in the canister and, due to the FTIV being stuck in the second position, purging fuel vapors from the fuel tank, to engine intake. As discussed above, the purging may be carried out until the canister is substantially free of stored fuel vapors, or until conditions change which necessitate aborting the purging operation. It may be understood that purging the fuel vapors from the canister may include commanding open the CPV while maintaining open the CVV, to draw fresh air across the canister, thereby desorbing fuel vapors from the canister and drawing the desorbed fuel vapors to the engine via the engine vacuum. Furthermore, it may be understood that the CPV may be duty cycled in a fashion whereby the duty cycle of the CPV is ramped up over time as a function of a learned amount of vapors being inducted to the engine. The learning may be based, for example, on exhaust gas sensor output, canister temperature changes, etc.

Proceeding to 1150, method 1100 may include updating vehicle operating parameters. Updating vehicle operating parameters at 1150 may include updating the canister loading state, for example, based on the purging operation. Method 1100 may then end.

Returning to 1115, responsive to the FTIV being indicated to be stuck in the third position, method 1100 may proceed to FIG. 12. Turning now to FIG. 12, example method 1200 continues from method 1100. At 1205, method 1200 includes indicating whether the vehicle is in operation. If so, method 1200 may proceed to 1210. At 1210, method 1200 may include commanding closed the CVV. Specifically, the FTIV being stuck in the third position differs from the FTIV being stuck in the second position in that fuel vapors may travel past the canister to atmosphere when the FTIV is stuck in the third position, as opposed to having to travel through the canister to atmosphere when the FTIV is stuck in the second position. By commanding closed the CVV, the fuel system and evaporative emissions system may be sealed, which may prevent release of undesired evaporative emissions to atmosphere.

Proceeding to 1215, method 1200 may include monitoring fuel system and evaporative emissions system pressure, for example, via the FTPT. At 1220, method 1200 may include indicating whether fuel system pressure and evaporative emissions system pressure is greater than a threshold pressure. The threshold pressure may comprise a pressure that is undesirable for the sealed fuel system and evaporative emissions system, for example.

If fuel system pressure is greater than the threshold pressure, method 1200 may proceed to 1225. At 1225, method 1200 may include duty cycling the CPV to draw fuel vapors into the canister. Specifically, duty cycling the CPV may route fuel vapors from the fuel tank and evaporative emissions system into the canister via the second flow path. It may be understood that the action of duty cycling the CPV may take place while the CVV remains closed. In this way, fuel vapors may be adsorbed by the canister, and not necessarily purged to engine intake. Furthermore, the duty cycling may be controlled so as not to impart a vacuum great enough on the canister to pull fuel vapors through the canister. Thus, the duty cycle may be controlled to achieve a desired pressure difference across the canister. In one example, such a pressure difference may be determined based on a difference between pressure in the intake manifold (e.g. monitored via pressure sensor 213) and pressure in the fuel system (e.g. monitored via FTPT 291). It may be understood that the fuel system pressure may be relied upon due to the FTIV being stuck in the third position, thus fluidically coupling the fuel system to the evaporative emissions system. Said another way, the vacuum directed at the canister via duty cycling the CPV may be controlled (by controlling CPV duty cycle) so as to draw fuel vapors into the canister at a rate sufficient for adsorption but not great enough to pull vapors through the canister.

Continuing to 1230, method 1200 may include estimating canister loading state. Similar to that discussed before, temperature changes within the canister as monitored via the canister temperature sensor (e.g. 232) may be relied upon for inferring canister loading state. Additionally or alternatively, canister loading state may be inferred as a function of fuel tank pressure and how frequently (e.g. number of times) the CPV is commanded to be duty cycled to draw the fuel vapors into the canister.

Proceeding to 1235, method 1200 may include indicating whether purging conditions are met. For example, based on the estimates of canister loading state while the vehicle is in operation, it may be determined whether a threshold canister loading state is reached or exceeded. The threshold canister loading state in this particular example may comprise a similar threshold canister loading state as that discussed above at step 1140 of method 1100.

In response to conditions being met for purging the canister at 1235, method 1200 may proceed to 1240. At 1240, method 1200 may include purging the canister and fuel tank vapors to the engine. Such action may include commanding open the CPV, and commanding open the CVV. As discussed above, the commanding open of the CPV may include duty cycling the CPV, and ramping up the CPV duty cycle over time as a function of a learned amount of fuel vapors being inducted to the engine. The purging may proceed until it is inferred that the canister is substantially free of fuel vapors, or if a change in operating parameters occurs such that the purging event is aborted.

Continuing to 1245, method 1200 may include updating vehicle operating parameters. Updating vehicle operating parameters may include commanding closed the CPV and commanding closed the CVV. Updating vehicle operating parameters may further include updating the canister loading state as a function of the extent to which the canister was inferred to have been purged. Method 1200 may then end.

Thus, by relying on the methodology discussed above with regard to FIG. 12, mitigating action in response to an FTIV stuck in the third position may be taken to avoid release of undesired evaporative emissions to atmosphere while the vehicle is in operation.

Returning to 1205, in response to an indication that the vehicle is not in operation, method 1200 may proceed to 1250. At 1250, method 1200 may include indicating if refueling is requested. If so, method 1200 may proceed to 1255. At 1255, method 1200 may include commanding closed the CVV and commanding open the CPV. While not explicitly illustrated, in some examples the intake throttle may be commanded to an at least partially open state. In other examples, the throttle may be commanded closed, but the engine may be spun unfueled via the motor to position at least one engine cylinder with both its intake and exhaust valves open. In this way, a pathway to atmosphere via either the at least partially open throttle or the at least one cylinder with its intake and exhaust valves open may be established, which may encourage the flow of fuel vapors along the second flow path through the entirety of the canister.

Proceeding to 1265, responsive to pressure in the fuel system being less than a threshold pressure (e.g. within a threshold of atmospheric pressure), method 1200 may proceed to 1270. At 1270, the refueling lock may be commanded open. Alternatively, if the refueling lock comprises a passively mechanically actuated refueling lock, when pressure drops below the threshold pressure then the lock may open.

Continuing to 1275, method 1200 may include monitoring fuel level during refueling, as discussed above. Continuing to 1280, method 1200 may determine whether the refueling event is completed. Such an indication may be in response to fuel level plateauing for a predetermined duration, an indication that the dispensing nozzle has been removed from the fuel filler neck, an indication that the refueling lock has been again locked, etc. In response to the refueling event having been completed, method 1200 may proceed to 1285, where operating parameters may be updated. Specifically, canister loading state may be updated as a function of the refueling event. For example, while not specifically illustrated, it may be understood that one or more of temperature changes at the canister, amount of fuel added to the tank, fuel tank pressure during refueling, etc., may be relied upon for inferring canister loading state based on the refueling event. Furthermore, updating vehicle operating parameters may include updating the level of fuel in the fuel tank as a function of the refueling event.

Returning to 1250, in response to the vehicle not being in operation and refueling not being requested, method 1200 may proceed to 1290. At 1290, method 1200 may include maintaining current operating parameters. In other words, further action may not be taken, but while not explicitly illustrated it may be understood that for vehicle-off conditions in the absence of refueling but where it is indicated that the FTIV is stuck in the third position, the CVV may be commanded closed and the CPV commanded open. Thus, similar to that discussed for the refueling event, fuel vapors stemming from the fuel tank may be directed along the second flow path, through the entirety of the canister, rather than being allowed to simply escape to atmosphere. It may be understood that, to provide motive force for the fuel vapors to travel through the canister, the intake throttle may be commanded at least partially open in one example, or in another example the engine may be spun unfueled to position at least one cylinder of the engine with its intake valve and exhaust valve open. In an event where the canister becomes saturated and fuel vapors break through the canister, it may be understood that the fuel vapors may be adsorbed in the intake manifold via the air intake system hydrocarbon trap (e.g. 224). By commanding the CVV closed and the CPV open while the vehicle is not in operation, the release of undesired evaporative emissions to atmosphere due to the FTIV being stuck in the third position may be avoided.

In this way, a three-way FTIV may be diagnosed as to being stuck in a first open position or a second open position. By diagnosing whether the FTIV is stuck in the first open position or the second open position, appropriate mitigating action may be taken for particular vehicle operating scenarios, in order to reduce opportunity for release of undesired evaporative emissions to atmosphere.

The technical effect of monitoring a time duration between when the CPV is commanded open and the exhaust gas oxygen sensor switching rich is that the time duration may be used to infer whether fuel vapors stemming from the fuel tank are routed to the engine via a first flow path or a second flow path. In this way, it may be inferred as to whether the FTIV is stuck in the first open position or the second open position. The technical effect of determining whether the FTIV is stuck in the first open position or the second open position is that appropriate mitigating action may be taken to reduce or avoid release of undesired emissions to atmosphere.

Thus, the systems discussed herein and with regard to FIGS. 1-2, along with the methods described herein and with regard to FIGS. 3-4, 6, 8, and 11-12, may enable one or more systems and one or more methods. In one example, a method comprises diagnosing whether a fuel tank isolation valve positioned in a load conduit between a fuel system and a fuel vapor storage canister is stuck in a first open position or a second open position based on a time duration between commanding open a canister purge valve to direct fuel vapors to an engine and an exhaust gas sensor indicating a rich air-fuel ratio as compared to a stoichiometric air-fuel ratio. In a first example of the method, the method may further include wherein the fuel tank isolation valve comprises a three-way isolation valve configurable in a first position, a second position and a third position, where the first position comprises a closed position, the second position comprises the first open position, and the third position comprises the second open position. A second example of the method optionally includes the first example, and further comprises sealing the fuel system and fuel vapor storage canister from the engine and from atmosphere; monitoring a pressure in the fuel system; and wherein commanding open the canister purge valve is in response to the pressure in the fuel system being greater than a predetermined positive pressure threshold with respect to atmospheric pressure. A third example of the method optionally includes any one or more or each of the first and second examples, and further includes wherein the fuel tank isolation valve being stuck in the first open position directs fuel vapors from the fuel system through a portion of the fuel vapor storage canister in response to the canister purge valve being commanded open; and wherein the fuel tank isolation valve being stuck in the second open position directs fuel vapors from the fuel system through an entirety of the fuel vapor storage canister in response to the canister purge valve being commanded open. A fourth example of the method optionally includes any one or more or each of the first through third examples, and further comprises indicating the fuel tank isolation valve is stuck in the first open position in response to the time duration comprising a first time duration and indicating the fuel tank isolation valve is stuck in the second open position in response to the time duration comprising a second time duration. A fifth example of the method optionally includes any one or more or each of the first through fourth examples, and further includes wherein the first time duration is of a shorter duration than the second time duration. A sixth example of the method optionally includes any one or more or each of the first through fifth examples, and further includes wherein commanding open the canister purge valve further comprises maintaining a canister vent valve closed, the canister vent valve positioned in a vent line that fluidically couples the fuel vapor storage canister to atmosphere; and in response to the exhaust gas sensor not indicating the rich air-fuel ratio during the first time duration, commanding open the canister vent valve and maintaining open the canister purge valve. A seventh example of the method optionally includes any one or more or each of the first through sixth examples, and further comprises adjusting the first time duration and the second time duration as a function of an extent to which a canister filter is inferred to be clogged. An eighth example of the method optionally includes any one or more or each of the first through seventh examples, and further includes wherein diagnosing whether the fuel tank isolation valve is stuck in the first open position or the second open position is in response to an expected positive pressure or an expected negative pressure with respect to atmosphere failing to develop in the fuel system with the fuel tank isolation valve commanded closed.

Another example of a method for a vehicle comprises diagnosing whether a fuel tank isolation valve that regulates a flow of fuel vapors from a fuel system to an evaporative emissions system that includes a fuel vapor storage canister is stuck in a first open position or a second open position based on a time duration for an exhaust gas sensor to indicate a rich air-fuel ratio in response to purging the fuel vapors to an engine; and taking mitigating action in response the fuel tank isolation valve being stuck in the first open position or the second open position. In a first example of the method, the method further includes wherein the fuel tank isolation valve being stuck in the first open position directs fuel vapors through a buffer region of the fuel vapor storage canister and not through an entirety of the fuel vapor storage canister in response to the purging; and wherein the fuel tank isolation valve being stuck in the second open position directs fuel vapors through an entirety of the fuel vapor storage canister including the buffer region in response to the purging. A second example of the method optionally includes the first example, and further comprises initiating the purging in response to a pressure in the fuel system greater than a predetermined positive pressure threshold while the fuel system and evaporative emissions system are sealed from atmosphere and the engine. A third example of the method optionally includes any one or more or each of the first and second examples, and further includes wherein the time duration comprises one of a first duration and a second duration, the second duration being greater than the first duration; and wherein diagnosing whether the fuel tank isolation valve is stuck in the first open position or the second open position comprises indicating the fuel tank isolation valve is stuck in the first open position in response to the exhaust gas sensor indicating the rich air-fuel ratio during the first duration and indicating the fuel tank isolation valve is stuck in the second open position in response to the exhaust gas sensor indicating the rich air-fuel ratio during the second duration. A fourth example of the method optionally includes any one or more or each of the first through third examples, and further includes wherein taking mitigating action further comprises: monitoring a loading state of the fuel vapor storage canister while the vehicle is in operation; and purging the fuel vapor storage canister in response to the loading state being indicated to be greater than a threshold loading state, wherein the fuel vapor storage canister is coupled to atmosphere while monitoring the loading state in response to the fuel tank isolation valve being indicated to be stuck in the first open position, and wherein the fuel vapor storage canister is sealed from atmosphere while monitoring the loading state in response to the fuel tank isolation valve being indicated to be stuck in the second open position. A fifth example of the method optionally includes any one or more or each of the first through fourth examples, and further includes wherein taking mitigating action further comprises: in response to the fuel tank isolation valve being indicated to be stuck in the second open position, and further in response to an indication of a request for refueling or a vehicle-off condition, sealing the fuel system and the evaporative emissions system from atmosphere and fluidically coupling the fuel system and the evaporative emissions system to the engine.

An example of a system for a vehicle comprises a fuel tank isolation valve positioned in a load conduit between a fuel tank and a fuel vapor storage canister, the fuel tank isolation valve configurable in a first position, a second position, and a third position, the first position comprising a closed position, the second position comprising a first open position, and the third position comprising a second open position; an exhaust gas sensor positioned in an exhaust passage of an engine; and a controller with computer readable instructions stored on non-transitory memory that when executed cause the controller to: responsive to an indication that the fuel tank isolation valve is not adopting the first position when commanded to do so, conducting a diagnostic to determine whether the fuel tank isolation valve is stuck in the first open position or the second open position, the diagnostic based on a time frame in which fuel vapors stemming from the fuel tank are routed to an engine as monitored via output from the exhaust gas sensor. In a first example of the system, the system further comprises a canister purge valve that regulates a flow of fuel vapors from the fuel tank to the engine; and wherein the controller stores further instructions to command the canister purge valve open for routing the fuel vapors to the engine. A second example of the system optionally includes the first example, and further comprises a canister vent valve positioned in a vent line stemming from the fuel vapor storage canister; and wherein the controller stores further instructions to indicate that the fuel tank isolation valve is stuck in the first open position in response to the time frame comprising a first time frame that is shorter than a second time frame, and indicate that the fuel tank isolation valve is stuck in the second open position in response to the time frame comprising the second time frame; wherein the canister vent valve is commanded closed during the first time frame and is commanded open during the second time frame. A third example of the system optionally includes any one or more or each of the first and second examples, and further comprises a canister filter; and wherein the controller stores further instructions to adjust the first time frame and the second time frame as a function of an extent to which the canister filter is inferred to be clogged. A fourth example of the system optionally includes any one or more or each of the first through third examples, and further includes wherein the controller stores further instructions to command the fuel tank isolation valve to the first position for conducting the diagnostic.

In another representation, a method for a vehicle comprises in response to an indication that a fuel tank isolation valve is stuck in an open configuration that directs fuel vapors from a fuel tank to a vent line upstream of a fuel vapor storage canister, sealing the vent line from atmosphere and fluidically coupling the fuel vapor storage canister to an intake of an engine. In such a method, sealing the vent line and fluidically coupling the fuel vapor storage canister to the intake may include commanding closed a canister vent valve and commanding open a canister purge valve under conditions where the fuel tank is being refueled and/or under conditions where the vehicle is not in operation. In such a method, sealing the vent line and fluidically coupling the fuel vapor storage canister to the intake may include commanding closed the canister vent valve and duty cycling the canister purge valve in response to a predetermined fuel system pressure being reached or exceeded during engine operation.

In yet another representation a method comprises conducting a diagnostic to determine whether a fuel tank isolation valve is stuck in a first open position or a second position based on a time duration between commanding open a canister purge valve to route fuel vapors from a fuel tank to an engine and an exhaust gas sensor outputting a rich air-fuel ratio, the time duration set as a function of an extent to which a canister filter positioned adjacent to a purge port of the canister, is clogged.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
diagnosing whether a fuel tank isolation valve positioned in a load conduit between a fuel system and a fuel vapor storage canister is stuck in a first open position or a second open position based on a time duration between commanding open a canister purge valve to direct fuel vapors to an engine and an exhaust gas sensor indicating a rich air-fuel ratio as compared to a stoichiometric air-fuel ratio, wherein the fuel tank isolation valve comprises a three-way isolation valve configurable in a first position, a second position and a third position, where the first position comprises a closed position, the second position comprises the first open position, and the third position comprises the second open position.

2. The method of claim 1, further comprising:
sealing the fuel system and fuel vapor storage canister from the engine and from atmosphere;
monitoring a pressure in the fuel system; and
wherein commanding open the canister purge valve is in response to the pressure in the fuel system being greater than a predetermined positive pressure threshold with respect to atmospheric pressure.

3. A method comprising:
diagnosing whether a fuel tank isolation valve positioned in a load conduit between a fuel system and a fuel vapor storage canister is stuck in a first open position or a second open position based on a time duration between commanding open a canister purge valve to direct fuel vapors to an engine and an exhaust gas sensor indicating a rich air-fuel ratio as compared to a stoichiometric air-fuel ratio, wherein the fuel tank isolation valve being stuck in the first open position directs fuel vapors from the fuel system through a portion of the fuel vapor storage canister in response to the canister purge valve being commanded open; and
wherein the fuel tank isolation valve being stuck in the second open position directs fuel vapors from the fuel system through an entirety of the fuel vapor storage canister in response to the canister purge valve being commanded open.

4. The method of claim 3, further comprising indicating the fuel tank isolation valve is stuck in the first open position in response to the time duration comprising a first time duration and indicating the fuel tank isolation valve is stuck in the second open position in response to the time duration comprising a second time duration.

5. The method of claim 4, wherein the first time duration is of a shorter duration than the second time duration.

6. The method of claim 4, wherein commanding open the canister purge valve further comprises maintaining a canister vent valve closed, the canister vent valve positioned in a vent line that fluidically couples the fuel vapor storage canister to atmosphere; and
in response to the exhaust gas sensor not indicating the rich air-fuel ratio during the first time duration, commanding open the canister vent valve and maintaining open the canister purge valve.

7. The method of claim 4, further comprising adjusting the first time duration and the second time duration as a function of an extent to which a canister filter is inferred to be clogged.

8. The method of claim 3, wherein diagnosing whether the fuel tank isolation valve is stuck in the first open position or the second open position is in response to an expected positive pressure or an expected negative pressure with respect to atmosphere failing to develop in the fuel system with the fuel tank isolation valve commanded closed.

9. A method for a vehicle comprising:
diagnosing whether a fuel tank isolation valve that regulates a flow of fuel vapors from a fuel system to an evaporative emissions system that includes a fuel vapor storage canister is stuck in a first open position or a second open position based on a time duration for an exhaust gas sensor to indicate a rich air-fuel ratio in response to purging the fuel vapors to an engine; and taking mitigating action in response to the fuel tank isolation valve being stuck in the first open position or the second open position, wherein the fuel tank isolation valve being stuck in the first open position directs fuel vapors through a buffer region of the fuel vapor storage canister and not through an entirety of the fuel vapor storage canister in response to the purging; and wherein the fuel tank isolation valve being stuck in the second open position directs fuel vapors through the entirety of the fuel vapor storage canister including the buffer region in response to the purging.

10. The method of claim 9, further comprising initiating the purging in response to a pressure in the fuel system greater than a predetermined positive pressure threshold while the fuel system and the evaporative emissions system are sealed from atmosphere and the engine.

11. The method of claim 9, wherein the time duration comprises one of a first duration and a second duration, the second duration being greater than the first duration; and wherein diagnosing whether the fuel tank isolation valve is stuck in the first open position or the second open position comprises indicating the fuel tank isolation valve is stuck in the first open position in response to the exhaust gas sensor indicating the rich air-fuel ratio during the first duration and indicating the fuel tank isolation valve is stuck in the second open position in response to the exhaust gas sensor indicating the rich air-fuel ratio during the second duration.

12. The method of claim 9, wherein taking mitigating action further comprises:

monitoring a loading state of the fuel vapor storage canister while the vehicle is in operation; and purging the fuel vapor storage canister in response to the loading state being indicated to be greater than a threshold loading state, wherein the fuel vapor storage canister is coupled to atmosphere while monitoring the loading state in response to the fuel tank isolation valve being indicated to be stuck in the first open position, and wherein the fuel vapor storage canister is sealed from atmosphere while monitoring the loading state in response to the fuel tank isolation valve being indicated to be stuck in the second open position.

13. The method of claim 9, wherein taking mitigating action further comprises:

in response to the fuel tank isolation valve being indicated to be stuck in the second open position, and further in response to an indication of a request for refueling or a vehicle-off condition, sealing the fuel system and the evaporative emissions system from atmosphere and fluidically coupling the fuel system and the evaporative emissions system to the engine.

14. A system for a vehicle, comprising:

a fuel tank isolation valve positioned in a load conduit between a fuel tank and a fuel vapor storage canister, the fuel tank isolation valve configurable in a first position, a second position, and a third position, the first position comprising a closed position, the second position comprising a first open position, and the third position comprising a second open position;

an exhaust gas sensor positioned in an exhaust passage of an engine;

a controller with computer readable instructions stored on non-transitory memory that when executed cause the controller to:

responsive to an indication that the fuel tank isolation valve is not adopting the first position when commanded to do so, conducting a diagnostic to determine whether the fuel tank isolation valve is stuck in the first open position or the second open position, the diagnostic based on a time frame in which fuel vapors stemming from the fuel tank are routed to the engine as monitored via output from the exhaust gas sensor; and a canister vent valve positioned in a vent line stemming from the fuel vapor storage canister;

wherein the controller stores further instructions to indicate that the fuel tank isolation valve is stuck in the first open position in response to the time frame comprising a first time frame that is shorter than a second time frame, and indicate that the fuel tank isolation valve is stuck in the second open position in response to the time frame comprising the second time frame; and wherein the canister vent valve is commanded closed during the first time frame and is commanded open during the second time frame.

15. The system of claim 14, further comprising a canister purge valve that regulates a flow of fuel vapors from the fuel tank to the engine; and wherein the controller stores further instructions to command the canister purge valve open for routing the fuel vapors to the engine.

16. The system of claim 14, further comprising a canister filter; and wherein the controller stores further instructions to adjust the first time frame and the second time frame as a function of an extent to which the canister filter is inferred to be clogged.

17. The system of claim 14, wherein the controller stores further instructions to command the fuel tank isolation valve to the first position for conducting the diagnostic.

* * * * *